(12) United States Patent
Arata

(10) Patent No.: US 7,403,666 B2
(45) Date of Patent: Jul. 22, 2008

(54) APPARATUS AND METHOD OF FILTERING DIGITAL INFORMATION

(75) Inventor: Katsumi Arata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 855 days.

(21) Appl. No.: 10/603,649

(22) Filed: Jun. 26, 2003

(65) Prior Publication Data
US 2005/0100238 A1    May 12, 2005

(30) Foreign Application Priority Data
Jun. 27, 2002    (JP) .............................. 2002-187297

(51) Int. Cl.
*G06K 9/40* (2006.01)
*G06F 7/00* (2006.01)
*G06F 17/10* (2006.01)

(52) U.S. Cl. .................... 382/262; 708/202; 708/304

(58) Field of Classification Search .................. 382/262; 708/202, 304
See application file for complete search history.

(56) References Cited

U.S. PATENT DOCUMENTS

| | | | | |
|---|---|---|---|---|
| 4,560,974 A | * | 12/1985 | Coleman et al. | 340/146.2 |
| 4,672,567 A | * | 6/1987 | Kelly et al. | 702/158 |
| 4,747,052 A | * | 5/1988 | Hishinuma et al. | 250/587 |
| 6,163,324 A | * | 12/2000 | Holder | 345/505 |
| 6,539,125 B1 | * | 3/2003 | Harrington | 382/262 |
| 6,760,737 B2 | * | 7/2004 | Jiang | 708/202 |
| 7,050,647 B2 | * | 5/2006 | Yamazaki | 382/262 |
| 2001/0034749 A1 | * | 10/2001 | Jiang | 708/202 |

FOREIGN PATENT DOCUMENTS

JP    6-61788 A    3/1994

* cited by examiner

*Primary Examiner*—Aaron W Carter
(74) *Attorney, Agent, or Firm*—Birch, Stewart, Kolasch & Birch, LLP

(57) ABSTRACT

A filtering apparatus calculates a median of image data that includes nine pixel values arranged in a window of 3*3. First, an input circuit receives as an input the image data, divides the data into groups each having three pixels, and outputs. The pixel values of each group are sorted in accordance with magnitude order, by a plurality of sorters. After sorting, the maximum values among the pixel values of the groups are determined by a plurality of shifters and a plurality of maximum value determiners, and the determined pixel values are removed from the corresponding groups. As a result, four largest pixel values are removed from the three groups. A last sorter extracts and outputs the maximum pixel value (median) from the remaining five pixel values.

34 Claims, 12 Drawing Sheets

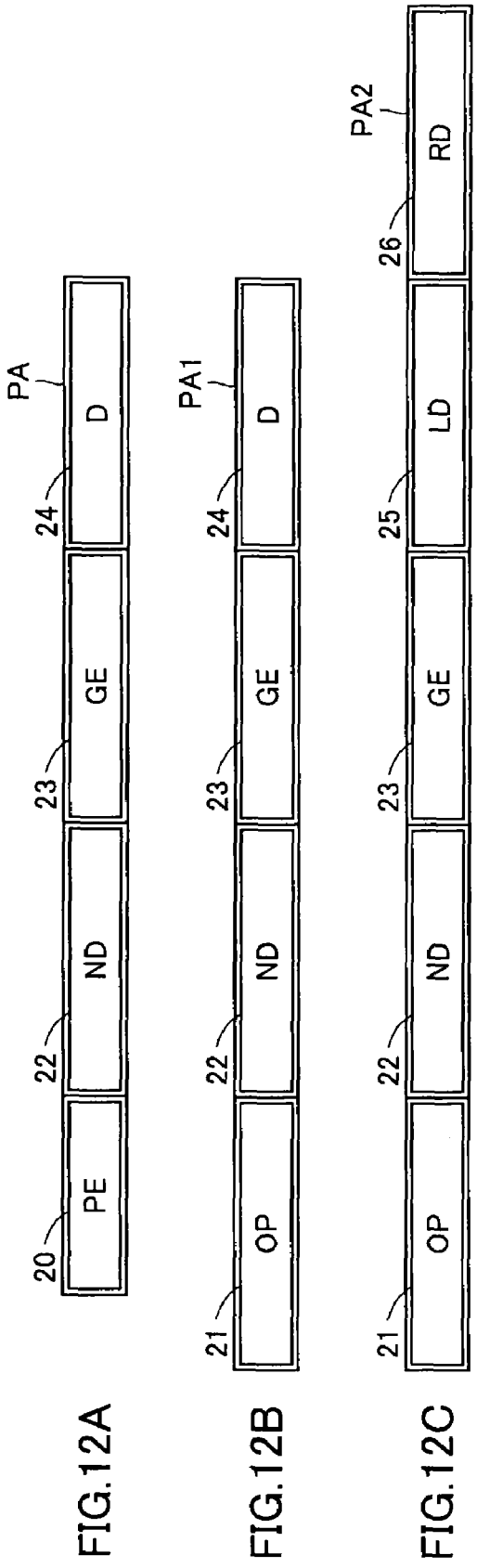

APPARATUS AND METHOD OF FILTERING DIGITAL INFORMATION

The present application claims priority under 35 U.S.C. §119 to Japanese Patent Application No. 2002-187297, filed Jun. 27, 2002, the entire disclosure of which is hereby incorporated by reference.

BACKGROUND OF THE INVENTION

1. Field of the Invention

The present invention relates to a filtering apparatus for filtering digital signals, a data driven type information processing apparatus, a filtering method, a filtering program and a machine-readable recording medium having the filtering program recorded thereon. More specifically, the present invention relates to a filtering apparatus for filtering digital signals, a data driven type information processing apparatus, a filtering method, a filtering program and a machine-readable recording medium having the filtering program recorded thereon, for median filtering that removes noise from noisy image data.

2. Description of the Background Art

In image related fields, median filtering process as a method of removing noise from an input image is an important function, an d higher speed of the filtering process is strongly desired.

In the median filtering process, for each pixel of the input image, a window (local area) having the size of K×L with the pixel of interest being at the center is considered, and a central value (median) of luminance data (hereinafter referred to as a pixel value) of K×L pixels is provided as the pixel value of each pixel in of the output image.

Conventionally, in the median filtering process using a 3×3 window, nine pixel values in the window are sorted and the central value of these pixels is calculated.

FIG. 15 shows an exemplary configuration of a conventional median filtering apparatus. The median filtering apparatus shown in FIG. 15 includes sorting circuits 801 to 803, 805, 806, 808, 809 and 811 sorting the input data in ascending or descending order and outputting the result, selectors 804, 807 and 810, maximum value determiners 812 to 814, and minimum value determiners 815 to 817.

An operation of the median filtering apparatus shown in FIG. 15 will be described, taking an example in which a central value of nine pixel values A0 to A2, B0 to B2 and C0 to C2 in a window having the size of 3×3 is calculated.

First, nine pixel values A0 to A2, B0 to B2 and C0 to C2 are divided in advance into three groups G1 to G3 each having three pixel values, and the groups G1 to G3 are input to sorting circuits 801 to 803, respectively.

Sorting circuits 801 to 803 each sorts the three pixel values of the group input thereto and outputs the result of sorting to selector 804. The maximum pixel value represented by the result of sorting is output to maximum value determiner 812, and the minimum value represented by the result of sorting is output to minimum value determiner 815.

Maximum value determiner 812 receives as inputs the maximum pixel values of groups G1 to G3, compares the input pixel values with each other, determines the largest pixel value among the input pixel values, and outputs the result of determination to selector 804. Minimum value determiner 815 receives as inputs the minimum pixel values of groups G1 to G3, compares the input pixel values with each other, determines the smallest pixel value among the input pixel values, and outputs the result of determination to selector 804.

Selector 804 receives as inputs nine pixel values as the result of sorting from sorting circuits 801 to 803, removes therefrom the largest and smallest pixel values represented by the results of determination received from maximum value determiner 812 and minimum value determiner 815, and outputs the result. By this operation, two pixel values are removed from the input nine pixel values, and hence, seven pixel values are output.

Then, selector 804 divides the seven pixel values into three groups having three pixels, three pixels and one pixel, respectively, and outputs these groups. Specifically, the groups consisting of three pixels are output to sorting circuits 805 and 806, respectively, and group 818 consisting of one pixel is output to selector 807, maximum value determiner 813 and minimum value determiner 816. Sorting circuits 805 and 806 sort the pixel values of the input groups respectively, and output the results of sorting to selector 807. The maximum pixel values and the minimum pixel values as represented by the results of sorting are output to maximum value determiner 813 and to minimum value determiner 816, respectively.

Maximum value determiner 813 receives the three pixel values input thereto, compares the input pixel values with each other, determines the largest pixel value among the input pixel values, and outputs the result of determination to selector 807. Minimum value determiner 816 receives the pixel values input thereto, compares the input pixel values with each other, determines the smallest pixel value among the input pixel values, and outputs the result of determination to selector 807.

Selector 807 receives as inputs six pixel values as the result of sorting from sorting circuits 805 and 806 and receives one pixel value of group 818, removes therefrom the largest pixel value and the smallest pixel value represented by the results of determination given from maximum value determiner 813 and minimum value determiner 816, and outputs the result. By this operation, two pixel values are removed from input seven pixel values, and hence, five pixel values are output.

Thereafter, selector 807 divides the five pixel values into a group consisting of three pixel values and a group consisting of two pixel values, and outputs the group consisting of three pixel values to sorting circuit 808 and outputs the group consisting of two pixel values to sorting circuit 809. Sorting circuits 808 and 809 sort the pixel values of the input groups, respectively, output the result of sorting to selector 810, output the maximum pixel values and minimum pixel values as represented by the results of sorting to maximum value determiner 814 and minimum value determiner 817, respectively.

Maximum value determiner 814 compares input pixel values with each other, determines the largest pixel value among the input pixel values, and outputs the result of determination to selector 810. Minimum value determiner 817 compares input pixel values with each other, determines the smallest pixel value among the input pixel values, and outputs the result of determination to selector 810.

Selector 810 receives as inputs five pixel values as the results of sorting from sorting circuits 808 and 809, removes therefrom the largest and smallest pixel values as represented by the results of determination by maximum value determiner 814 and minimum value determiner 817, and outputs the result to sorting circuit 811. By this operation, two pixel values are removed from the input five pixel values, and hence three pixel values are output.

Sorting circuit 811 sorts the three pixel values input from selector 810, and outputs the pixel value at the center of the series of pixel values given as the result of sorting as the median.

In the above described median filtering process, in order to calculate the central value of nine input pixel values, the input pixel values are divided into three groups each consisting of three pixel values and sorting process is performed in each group, and the largest and smallest two pixel values are removed by a selector in accordance with the result of sorting, so as to reduce the number of pixel values as the object of processing. This process is repeated to reduce two by two the number of pixel values as the object of processing, and the central value is eventually obtained. Here, sorting is necessary every time the largest and smallest values are to be removed, and in the example shown in FIG. 15, eight sorting circuits are necessary. Further, three maximum value determiners and three minimum value determiners are necessary. As the sorting circuits, maximum value determiner and minimum value determiner employ comparators, a total of 36 comparators are necessary in the circuitry of FIG. 15 as a whole. Consequently, the circuit scale of the median filtering apparatus becomes large, and the number of pipelines increases when the median filtering process using such a median filtering apparatus is executed along with pipeline processing. Accordingly, it has been difficult to realize high-speed median filtering process.

A filtering apparatus described in Japanese Patent Laying-Open No. 6-61788 includes a register file, which has a plurality of registers and has data, constants and initial values read and written in accordance with the single write and single read rule, and a group of operators having a multiplier and an addition-shift combined operator. Therefore, a basic filtering operation in FIR filtering process and IIR filtering process can be represented as a minimum instruction unit, and the filtering process can be executed at high speed.

Further, the number of entries of the register file corresponds to the number of taps, and therefore, the number of entries can be set by a program, and a filter of an arbitrary configuration can easily be implemented.

This configuration, however, can cope with the FIR and IIR filters only, and only a program-based solution is available to realize the median filtering process.

SUMMARY OF THE INVENTION

An object of the present invention is to provide a filtering apparatus of which circuit scale is small.

Another object of the present invention is to provide a filtering apparatus, a data driven type information processing apparatus, a filtering method, a filtering program and a machine-readable recording medium having the filtering program recorded thereon, that realize high speed filtering process.

According to an aspect of the present invention, the above described objects can be attained by a filtering apparatus including a receiving unit, a removing unit and a sorting unit, in order to calculate a median of N pixel values arranged in a two-dimensional area of K*K (K: an odd number not smaller than 3) of a digitized image. When the receiving unit receives N pixel values, the removing unit removes, from the received N pixel values, the first to ((N-1)/2)th pixel values as sorted in accordance with a prescribed order. The sorting unit outputs, from the (N-(N-1)/2) pixel values remaining after the removal of the pixel values by the removing unit, the first pixel value as sorted in accordance with the prescribed order, as the median.

According to another aspect of the present invention, the above described objects can be attained by a filtering apparatus including an input unit, a removing unit and a sorting unit, in order to calculate a median of N pixel values arranged in a two-dimensional area of K*K (K: an odd number not smaller than 3) of a digitized image. When the receiving unit receives N pixel values, the removing unit removes, from the input N pixel values, the ((N-1)/2)+2)th to Nth pixel values as sorted in accordance with a prescribed order. The sorting unit outputs, from the (N-(N-1)/2) pixel values remaining after the removal of the pixel values by the removing unit, the (N-(N-1)/2)th pixel value as sorted in accordance with the prescribed order, as the median.

Therefore, in the above described filtering apparatuses, only two sorting operations of pixels, that is, one at the removing unit and one at the sorting unit, are necessary. Therefore, the number of circuits related to the sorting operation of the filtering apparatus can be reduced. Consequently, the scale of the apparatus becomes smaller. Further, as there is less sorting process, the median can be calculated at a higher speed by the filtering apparatus.

In the above described filtering apparatus, preferably, the prescribed order is either ascending order or descending order. Therefore, the pixel values may be sorted either in the ascending order or the descending order, and hence there is a high degree of freedom in designing the filtering apparatus.

Preferably, in the above described filtering apparatus, the receiving unit has a dividing unit and a group sorting unit. When the dividing unit divides received N pixel values into K groups each consisting of K pixel values, the group sorting unit receives as inputs the pixel values of each of the K groups obtained by the division, sorts the same in accordance with a prescribed order, and outputs the result to the removing unit. The removing unit has a plurality of cascade-connected pixel removing units for removing (N-1)/2 pixel values from N pixel values. Each pixel removing unit has a determining unit and a shift storing unit receiving as inputs the pixel values of K groups, temporarily storing and outputting the same. The determining unit determines, among the first pixel values in accordance with the prescribed order of respective ones of the received K groups, at least one pixel value of the first or following order in accordance with the prescribed order, and the shift storing unit removes, in a group having the determined pixel value, the determined said pixel value from the pixel values of the corresponding group stored therein, shifts the order of the second and the following pixel values in accordance with the prescribed order after removal, and outputs the result.

Therefore, it is necessary for each of the pixel removing units to have the circuit for the determining unit and the circuit for the shift storing unit only, and the number of circuits can be reduced.

According to another aspect, the present invention provides a filtering apparatus including, where a plurality of local areas-including N pixel values of K*K (K is an odd number not smaller than 3) are arranged overlapping with each other in a prescribed area of a digitized image, in order to calculate a median of N pixel values in each local area, a receiving unit, and a median extracting unit corresponding to each of the plurality of local areas. The median extracting unit has a removing unit and a sorting unit.

When the receiving unit receives pixel values of the prescribed area and outputs, for each of the plurality of local areas, N pixel values included in the corresponding local area, the removing unit of the median extracting unit receives as inputs the N pixel values included in the corresponding local area, and from the input pixel values, removes the first to ((N-1)/2)th pixel values as sorted in accordance with a prescribed order. The sorting unit outputs the first pixel value as sorted in accordance with the prescribed order, as the median, from the (N-(N-1)/2) pixel values remaining after the removal of the pixel values by the removing unit.

According to another aspect, the present invention provides a filtering apparatus including, where a plurality of local areas including N pixel values of K*K (K is an odd number not smaller than 3) are arranged overlapping with each other in a prescribed area of a digitized image, in order to calculate a median of N pixel values in each local area, a receiving unit, and a median extracting unit corresponding to each of the plurality of local areas. The median extracting unit has a removing unit and a sorting unit.

When the receiving unit receives pixel values of the prescribed area and outputs, for each of the plurality of local areas, N pixel values included in the corresponding local area, the removing unit of the median extracting unit receives as inputs the N pixel values included in the corresponding local area, and from the received pixel values, removes ((N-1)/2)+2) to Nth pixel values as sorted in accordance with a prescribed order. The sorting unit outputs the (N-(N-1)/2)th pixel value as sorted in accordance with the prescribed order, as the median, from the (N-(N-1)/2) pixel values remaining after the removal of the pixel values by the removing unit.

Therefore, in the above described filtering apparatus, only two sorting operations of pixels, that is, one at the removing unit and one at the sorting unit, are necessary. Therefore, number of circuits related to the sorting operation of the filtering apparatus can be reduced. Consequently, the scale of the apparatus becomes smaller. Further, as there is less sorting process, the median can be calculated at higher speed by the filtering apparatus.

In the above described filtering apparatus, the results of sorting described above are shared by overlapping areas, and therefore, speed of processing can be improved.

In the above described filtering apparatus, preferably, the prescribed order is either ascending order or descending order. Therefore, the pixel values may be sorted either in the ascending order or the descending order, and hence there is a high degree of freedom in designing the filtering apparatus.

Preferably, in the above described filtering apparatus, the receiving unit has a dividing unit and a group sorting unit. When the dividing unit receives as inputs the pixel values of the local areas and divides the pixel values into a plurality of groups each including K pixel values, the group sorting unit receives, for each of the plurality of groups obtained by the division, the pixel values of the corresponding group, sorts in accordance with a prescribed order, and outputs the result to the removing unit that corresponds to the local area to which the corresponding group belongs.

The removing unit has a plurality of cascade-connected removing circuits for removing (N-1)/2 pixel values from N pixel values. Each of the removing circuits has a determining unit and a shift storing unit receiving as inputs the pixel values of the K groups, temporarily storing and outputting the same. The determining unit determines, among the first pixel values in accordance with the prescribed order of respective ones of the received K groups, at least one pixel value of the first or following order in accordance with the prescribed order, and the shift storing unit removes, in a group having the determined pixel value, the determined said pixel value from the pixel values of the corresponding group stored therein, shifts the order of the second and the following pixel values in accordance with the prescribed order after removal, and outputs the result.

Therefore, it is necessary for each of the removing circuits to have the circuit for the determining unit and the circuit for the shift storing unit only, and the number of circuits can be reduced.

According to a still further aspect, the present invention provides a data driven type information processing apparatus including an operating unit that receives a packet having at least a destination field storing destination information, an instruction field storing instruction information, and a data field storing data, and executes an operation in accordance with a data flow program, using the received packet.

The operating unit has a unit for filtering operation (filtering operation unit), a unit for other operations, and a branching unit. The filtering operation unit has a filtering operation unit performing an operation in accordance with a median filtering instruction, a unit for other operations, and a branching unit outputting, in accordance with instruction information of an input packet, the packet to either the filtering operation unit or to the unit for other operations. The median filtering instruction instructs calculation of a median of N pixel values arranged in a two-dimensional local area of K*K (K is an odd number not smaller than 3) of a digitized image.

The filtering operation unit includes a removing unit and a sorting unit. The removing unit removes, from N pixel values in the data field of a given packet, the first to ((N-1)/2)th pixels as sorted in accordance with a prescribed order. The sorting unit stores the first pixel sorted in accordance with the prescribed order among the (N-(N-1)/2) pixel values remaining after the removal of the pixel values, as the median, in the data field of the packet, and outputs the packet.

According to a still further aspect, the present invention provides a data driven type information processing apparatus including an operating unit that receives a packet having at least a destination field storing destination information, an instruction field storing instruction information, and a data field storing data, and executes an operation in accordance with a data flow program, using the received packet.

The operating unit has a filtering operation unit performing an operation in accordance with a median filtering operation, a unit for other operations, and a branching unit outputting, in accordance with instruction information of an input packet, the packet to either the filtering operation unit or to the unit for other operations. The median filtering instruction instructs calculation of a median of N pixel values arranged in a two-dimensional area of K*K (K is an odd number not smaller than 3) of a digitized image.

The filtering operation unit includes a removing unit and a sorting unit. The removing unit removes, from N pixel values in the data field of a given packet, the ((N-1)/2+2) to Nth pixels as sorted in accordance with a prescribed order. The sorting unit stores the (N-(N-1)/2)th pixel as sorted in accordance with the prescribed order among the (N-(N-1)/2) pixel values remaining after the removal of the pixel values, as the median, in the data field of the packet, and outputs the packet.

In the above described data driven type information processing apparatus, the process in accordance with the data flow program including a median filtering instruction is executed in parallel through a pipeline process, as the packet circulates within the data driven type information processing apparatus. Therefore, even when the image as the object of median filtering process has a large amount of data, a high speed processing is possible.

Further, as to the sorting of pixel values at the filtering operation unit, only one sorting operation at the removing unit and one sorting operation at the sorting unit, are necessary. Therefore, a number of circuits related to the sorting operation of the filtering operation unit can be reduced. Consequently, the scale of the data driven type information processing apparatus becomes smaller.

In the above described data driven type information processing apparatuses, preferably, the prescribed order is either ascending order or descending order. Therefore, the pixel values may be sorted either in the ascending order or the descending order, and hence there is a high degree of freedom in designing the filtering operation unit.

Preferably, in the data driven type information processing apparatus, the filtering operation unit further has a receiving unit including a dividing unit and a group sorting unit. When a packet is received by the receiving unit from the branching unit, the dividing unit divides the N pixel values in the data field of the received packet to K groups each having K pixel values. The group sorting unit receives as inputs the pixel values of each of the K groups obtained by the division, sorts the same in accordance with a prescribed order, stores the sorted result in the data field of the packet and outputs the packet to the removing unit.

The removing unit has a plurality of cascade-connected pixel removing units for removing (N-1)/2 pixel values from N pixel values. Each pixel removing unit has a determining unit and a shift storing unit receiving as inputs the pixel values of K groups, temporarily storing and outputting the same. The determining unit determines, among the first pixel values in accordance with the prescribed order in each of the given K groups of packets, at least one pixel value of the first or following order in accordance with the prescribed order, and the shift storing unit removes, in the packet of a group having the determined pixel value, the determined said pixel value from the pixel values of the corresponding group stored therein, shifts the order of the second and the following pixel values in accordance with the prescribed order after removal and outputs the packet.

Therefore, it is necessary for each of the pixel removing units to have the circuit for the determining unit and the circuit for the shift storing unit only, and the number of circuits can be reduced.

According to a still further aspect, the present invention provides a data driven type information processing apparatus including an operating unit that receives a packet having at least a destination field storing destination information, an instruction field storing instruction information, and a data field storing data, and executes an operation in accordance with a data flow program, using the received packet.

The operating unit has a filtering operation unit performing an operation in accordance with a median filtering operation, a unit for other operations, and a branching unit outputting, in accordance with instruction information of an input packet, the packet to either the filtering operation unit or to the unit for other operations.

The median filtering instruction instructs, when a plurality of areas including N pixel values of K*K (K is an odd number not smaller than 3) are arranged overlapping with each other in a digitized image, calculation of a median of N pixel values in each local area.

The filtering operation unit includes a receiving unit, and a median extracting unit corresponding to each of the plurality of areas. The receiving unit receives pixel values of the plurality of areas in the data field of a received packet, and, for each of the areas, outputs a packet having N pixel values included in the corresponding area stored in the data field. The median extracting unit receives from the receiving unit the packet having the N pixel values included in the corresponding area stored in the data field, removes from the input pixel values the first to ((N-1)/2)th pixel values as sorted in accordance with a prescribed order, extracts as the median the first pixel value as sorted in accordance with the prescribed order among the remaining (N-(N-1)/2) pixel values in the data field of the packet after the removal of the pixel values, stores the extracted median in the data field of the packet, and outputs the packet.

According to a still further aspect, the present invention provides a data driven type information processing apparatus including an operating unit that receives a packet having at least a destination field storing destination information, an instruction field storing instruction information, and a data field storing data, and executes an operation in accordance with a data flow program using the received packet.

The operating unit has a filtering operation unit performing an operation in accordance with a median filtering operation, a unit for other operations, and a branching unit outputting, in accordance with instruction information of a received packet, the packet to either the filtering operation unit or to the unit for other operations. The median filtering instruction instructs, when a plurality of local areas including N pixel values of K*K (K is an odd number not smaller than 3) are arranged overlapping with each other in a digitized image, calculation of a median of N pixel values in each local area.

The filtering operation unit includes a receiving unit that receives pixel values of a prescribed area in the data field of a received packet, and, for each of the local areas, outputs a packet having N pixel values included in the corresponding local area stored in the data field, and a median extracting unit corresponding to each of the plurality of local areas.

The median extracting unit receives from the receiving unit the packet having the N pixel values included in the corresponding local area stored in the data field, removes from the received pixel values the ((N-1)/2)+2) to Nth pixel values as sorted in accordance with a prescribed order, extracts as the median the (N-(N-1)/2)th pixel value as sorted in accordance with the prescribed order among the remaining (N-(N-1)/2) pixel values in the data field of the packet after the removal of the pixel values, stores the extracted median in the data field of the packet, and outputs the packet.

In the above described data driven type information processing apparatuses, the process in accordance with the data flow program including a median filtering instruction is executed in parallel through a pipeline process, as the packet circulates within the data driven type information processing apparatus. Therefore, even when the image as the object of median filtering process has a large amount of data, a high speed processing is possible.

Further, as to the sorting of pixel values at the filtering operation unit, only one sorting operation at the removing unit and one sorting operation at the sorting unit, are necessary. Therefore, number of circuits related to the sorting operation of the filtering operation unit can be reduced. Consequently, the scale of the data driven type information processing apparatus becomes smaller.

In the above described data driven type information processing apparatuses, when parallel processing is performed among overlapping areas, the result of sorting mentioned above is shared by the overlapping areas. Therefore, high speed processing becomes possible.

In the above described data driven type information processing apparatus, preferably, the prescribed order is either ascending order or descending order. Therefore, the pixel values may be sorted either in the ascending order or the descending order, and hence there is a high degree of freedom in designing the filtering operation unit.

Preferably, the above described data driven type information processing apparatus further includes a program storing unit storing a data flow program consisting of a plurality of pieces of destination information and a plurality of pieces of instruction information, receiving a packet, reading the next order (subsequent) destination information and next order (subsequent) instruction information from the data flow program, storing the read information in the destination field and the instruction field of the received packet, respectively, and outputting the received packet, a pair of data detecting units receiving as an input the packet output from the program storing unit, storing, in the received packet, contents necessary for executing the instruction information in the instruction field of the packet and outputting the packet to the operating unit, and an input/output control unit receiving the packet output from the operating unit and outputting the packet to the outside or to the program storing unit.

In the data driven type information processing apparatus, simply by storing a data flow program including instruction information of a median filtering instruction in the program storing unit in advance, the median filtering operation can be executed.

According to a still further aspect, the present invention provides a filtering method including the receiving step, the removing step and the sorting step, in order to calculate a median of N pixel values arranged in a two-dimensional area of K*K (K is an odd number not smaller than 3) of a digitized image. In the receiving step, N pixel values are input, and in the removing step, the first to ((N-1)/2)th pixel values as sorted in accordance with a prescribed order are removed from the input N pixel values. In the sorting step, among the remaining (N-(N-1)/2) pixel values after removal of the pixel values by the removing step, the first pixel value as sorted in accordance with the prescribed order is output as the median.

According to a still further aspect, the present invention provides a filtering method including the input step, the removing step and the sorting step, in order to calculate a median of N pixel values arranged in a two-dimensional area of K*K (K is an odd number not smaller than 3) of a digitized image. In the receiving step, N pixel values are received, and in the removing step, the ((N-1)/2)+2) to Nth pixel values as sorted in accordance with a prescribed order are removed from the input N pixel values. In the sorting step, among the remaining (N-(N-1)/2) pixel values after removal of the pixel values by the removing step, the (N-(N-1)/2)th pixel value as sorted in accordance with the prescribed order is output as the median.

Therefore, as to the sorting of pixel values in the above described filtering method, only one sorting operation in the removing step and one sorting operation in the sorting step, are necessary. Therefore, processes related to the sorting can be reduced. Consequently, the median can be calculated at high speed by the filtering method.

In the above described filtering method, preferably, the prescribed order is either ascending order or descending order. Therefore, the pixel values may be sorted either in the ascending order or the descending order, and hence there is a high degree of freedom in the procedure to calculate the median.

Preferably, in the above described filtering method, the receiving step has the dividing step and the group sorting step. When N pixel values are received and divided into K groups each including K pixel values in the dividing step, for each of the K groups obtained by the division, the pixel values of the corresponding group are received and sorted in accordance with a prescribed order in the group sorting step, and the result is passed to the removing step.

The removing step has a plurality of pixel removing steps performed in a cascaded manner, for removing (N-1)/2 pixel values from N pixel values. Each pixel removing step has the determining step and the shift storing step of receiving pixel values of K groups and temporarily storing and outputting the same. In the determining step, among the first pixel values in accordance with a prescribed order in each of the given K groups, at least one pixel value of the first and the following order in accordance with the prescribed order is determined, and in the shift storing step, in the group including the determined pixel value, the determined pixel value is removed from the stored pixel values of the corresponding group, the order of the second and the following order of the pixel values after removal in accordance with the prescribed order is shifted, and the result is output.

Therefore, in each pixel removing step, only the process of the determining step and the shift storing step must be executed. Therefore, the median can be calculated at high speed.

According to a still further aspect of the present invention, when a filtering program of the above described filtering methods is executed by a computer, the above described effects obtained by each filtering method can be attained.

According to a still further aspect of the present invention, when the above described filtering program recorded on a machine-readable recording medium is executed by a computer, the above described effects obtained by each filtering method can be attained.

According to a still further aspect, the present invention provides a filtering method including, when a plurality of areas including N pixel values of K*K (K is an odd number not smaller than 3) are arranged overlapping with each other in a digitized image, in order to calculate a median of N pixel values in each of the local areas, the receiving step and the median extracting step corresponding to each of the plurality of areas. The median extracting step has the removing step and the sorting step.

When pixel values of a prescribed area are received and, for each of the plurality of areas, N pixel values included in the corresponding area are output in the receiving step, the N pixel values included in the corresponding area are received and from the received pixel values, the first to ((N-1)/2)th pixel values as sorted in accordance with a prescribed order are removed in the removing step of the median extracting step. In the sorting step, from the remaining (N-(N-1)/2) pixel values after the removal of the pixel values by the removing step, the first pixel value as sorted in accordance with the prescribed order is output as the median.

According to a still further aspect, the present invention provides a filtering method including, when a plurality of local areas including N pixel values of K*K (K is an odd number not smaller than 3) are arranged overlapping with each other in a prescribed area of a digitized image, in order to calculate a median of N pixel values in each of the local areas, the receiving step and the median extracting step corresponding to each of the plurality of local areas. The median extracting step has the removing step and the sorting step.

When pixel values of a prescribed area are received and, for each of e plurality of local areas, N pixel values included in the corresponding local area are output in the receiving step, the N pixel values included in the corresponding local area are received and from the received pixel values, the ((N-1)/2)+2)th to Nth pixel values as sorted in accordance with a prescribed order are removed in the removing step of the median extracting step. In the sorting step, from the remaining (N-(N-1)/2) pixel values after the removal of the pixel values by the removing step, the (N-(N-1)/2)th pixel value as sorted in accordance with the prescribed order is output as the median.

Therefore, as to the sorting of pixel values in the above described filtering method, only one sorting operation in the removing step and one sorting operation in the sorting step, are necessary. Therefore, processes related to the sorting can be reduced. Consequently, the median can be calculated at high speed by the filtering method.

In the above described filtering method, preferably, the prescribed order is either ascending order or descending order. Therefore, the pixel values may be sorted either in the ascending order or the descending order, and hence there is a high degree of freedom in designing the method of calculating the median.

Preferably, in the above described filtering method, the receiving step has the dividing step and the group sorting step. When pixel values of local areas are received and divided into a plurality of groups each including K pixel values in the dividing step, for each of the plurality of groups obtained by the division, the pixel values of the corresponding group are input and sorted in accordance with a prescribed order in the group sorting step, and the result is passed to the removing step.

The removing step has a plurality of pixel removing steps performed in a cascaded manner, for removing (N-1)/2 pixel values from N pixel values. Each pixel removing step has the determining step and the shift storing step of receiving pixel values of K groups and temporarily storing and outputting the same. In the determining step, among the first pixel values in accordance with a prescribed order in each of the given K groups, at least one pixel value of the first and the following order in accordance with the prescribed order is determined, and in the shift storing step, in the group including the determined pixel value, the determined pixel value is removed from the stored pixel values of the corresponding group, the order of the second and the following order of the pixel values after removal in accordance with the prescribed order is shifted, and the result is output.

Therefore, in each pixel removing step, only the process of the determining step and the shift storing step must be executed. Therefore, the median can be calculated at high speed.

According to a still further aspect of the present invention, when a filtering program of the above described filtering methods is executed by a computer, the above described effects obtained by each filtering method can be attained.

According to a still further aspect of the present invention, when the above described filtering program recorded on a machine-readable recording medium is executed by a computer, the above described effects obtained by each filtering method can be attained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 12A to 12C represent packet field arrangements in accordance with the second embodiment.

DESCRIPTION OF THE PREFERRED EMBODIMENTS

Embodiments of the present invention will be described in the following with reference to the figures.

First Embodiment

In the present embodiment, the median filtering process is implemented mainly by hardware. Here, two exemplary hardware implementations will be described.

First Exemplary Implementation of the Median Filtering Apparatus

Figure 1:
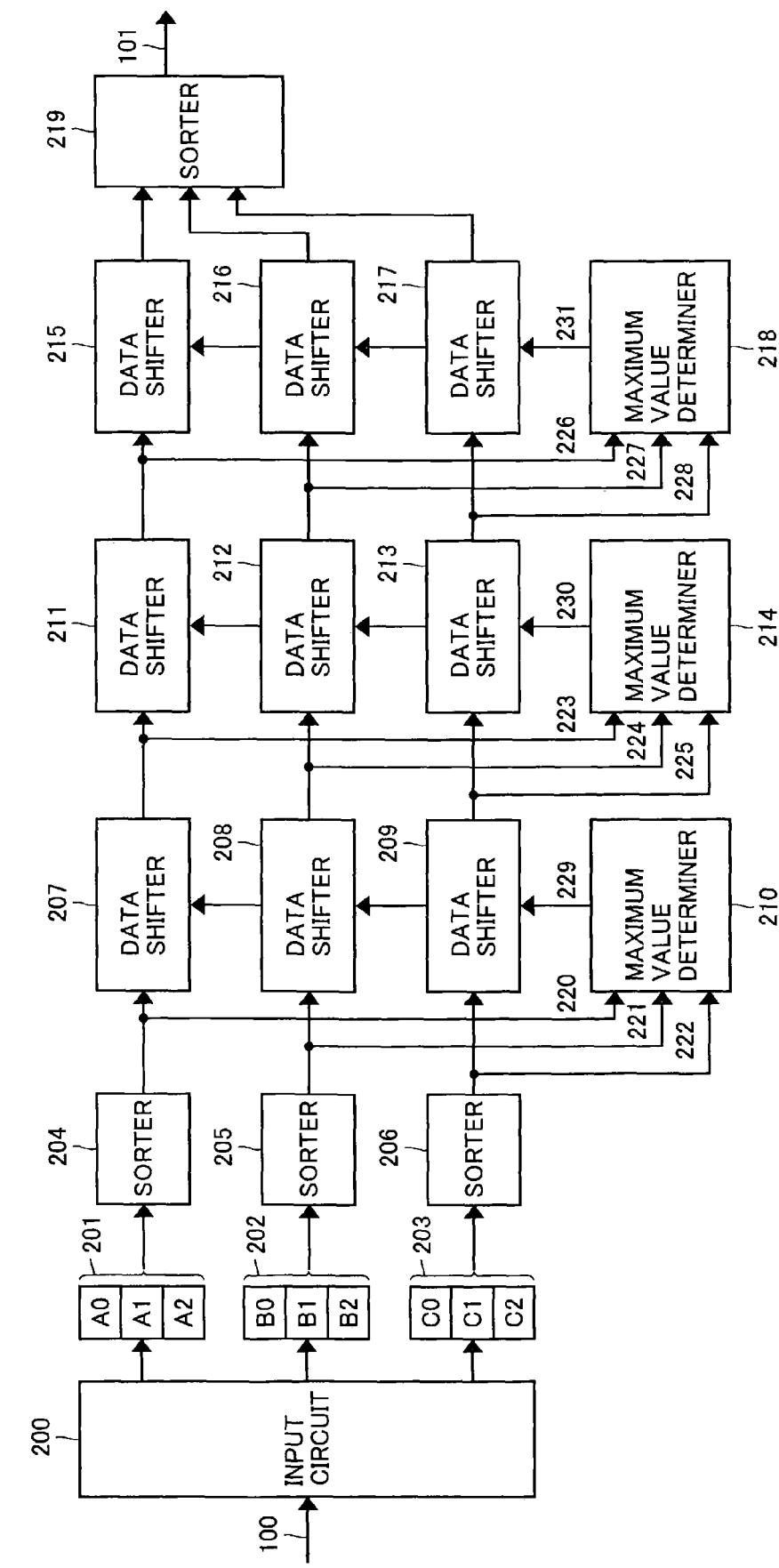
FIG. 1 represents a configuration of one median filtering apparatus in accordance with a first embodiment of the present invention.

FIG. 1 shows one exemplary hardware implementation. In the median filtering apparatus shown in FIG. 1, for each of the pixels of image data 100 as the input data, a central value among nine pixel values in a window of 3×3 with the pixel of interest being the center is output as median 101.

The median filtering apparatus shown in FIG. 1 includes an input circuit 200 receiving image data 100 and outputting 9 pixel values by generating groups 201 to 203 each having three pixel values, sorters 204 to 206 receiving a plurality of pixel values, sorting the same in the ascending order or descending order and outputting the results, data shifters 207 to 209, 211 to 213 and 215 to 217, maximum value determiners 210, 214 and 218, and a sorter 219 receiving and sorting a plurality of pixel values, and outputting only the largest pixel value indicated by the result of sorting. The pixel value output by sorter 219 represents the median 101. FIG. 2A to 2G represent details of the sorting and shifting of the pixel values in the median filtering apparatus shown in FIG. 1. In FIG. 1, sorter 204 and data shifters 207, 211 and 215 are provided for group 201, sorter 205 and data shifters 208, 212 and 216 are provided for group 202, and sorter 206 and data shifters 209, 213 and 217 are provided for group 203.

Figure 2A:
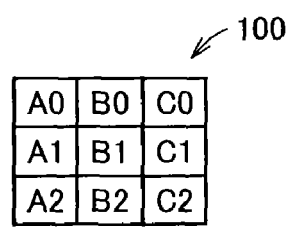
FIGS. 2A to 2G represent details of pixel value sorting and shifting in the median filtering apparatus shown in FIG. 1.
Figure 2B:
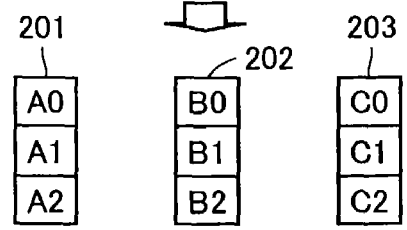

In operation, when image data 100 shown in FIG. 2A is given to input circuit 200, input circuit 200 receives the image data 100, divides nine pixel values in the window having the size of 3×3 mentioned above into three groups 201 to 203 each having three pixels arranged in a column (see FIG. 2B), and outputs groups 201 to 203 to sorters 204 to 206, respectively.

Figure 2C:
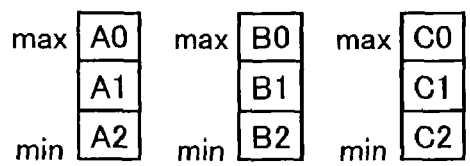

Sorters 204 to 206 each sort the three pixels of the input group and output the results of sorting to data shifters 207 to 209, respectively. At this time, the maximum pixel values 220 to 222 of respective groups represented by the results of sorting of groups 201 to 203 are output to maximum value determiner 210. An example of the results of sorting at this time of respective groups 201 to 203 is as shown in FIG. 2C. In this example, the maximum pixel values 220, 221 and 222 output to maximum value determiner 210 are pixel values A0, B0 and C0, respectively.

Figure 3:
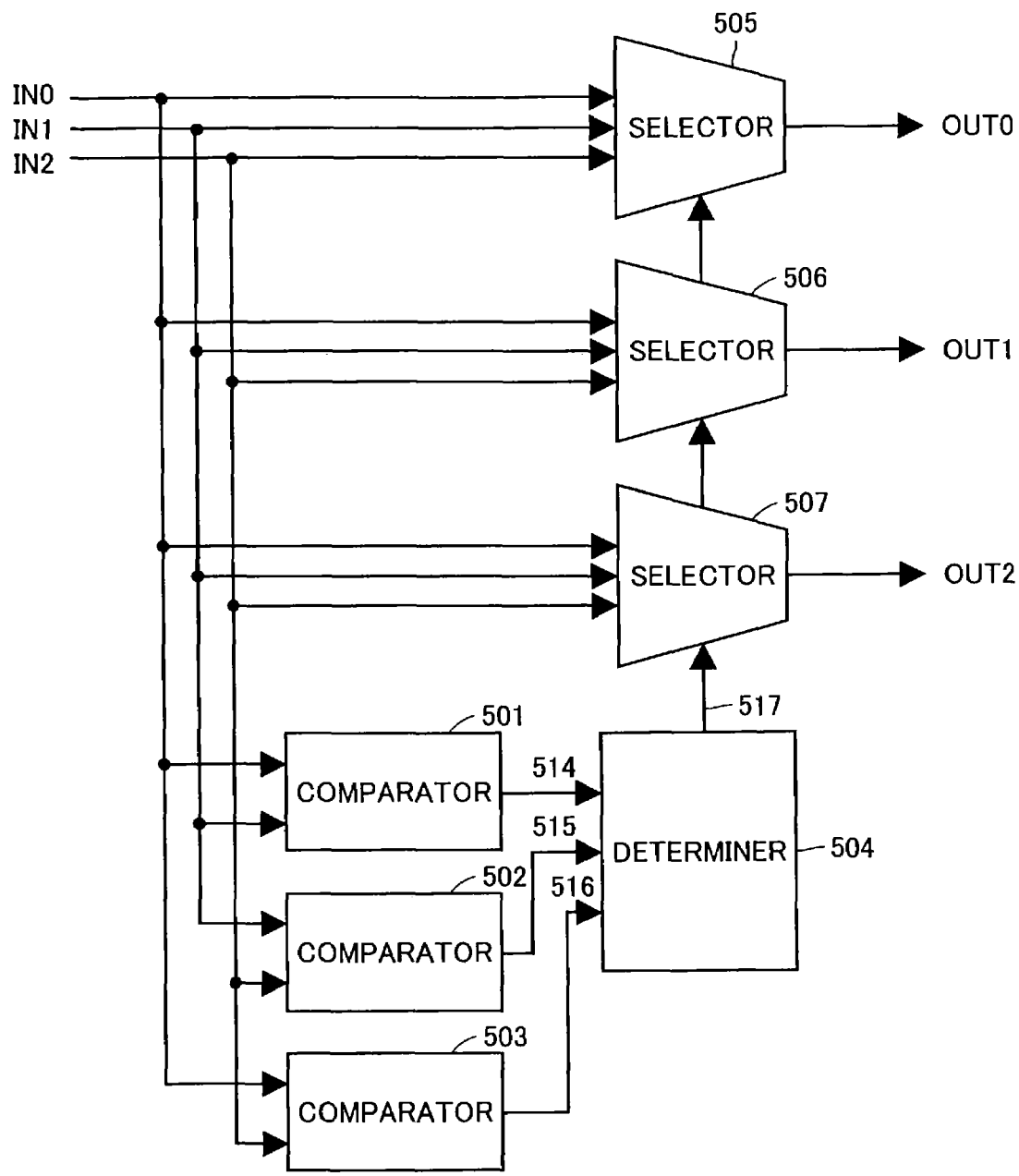
FIG. 3 represents a configuration of a sorter in accordance with the first embodiment of the present invention.

The sorter in accordance with the present embodiment shown in FIG. 3 has comparators 501 to 503, selectors 505 to 507 and a determiner 504. When three input values (pixel values) IN0 to IN2 are applied to the sorter, input values IN0 and IN1 are input to comparator 501, input values IN1 and IN2 are input to comparator 502, and input values IN0 and IN2 are input to comparator 503, respectively. Comparators 501 to 503 compare the applied two input values with each other and output signals 514 to 516 representing the results of comparison to determiner 504, respectively. In accordance with the input signals 514 to 516, determiner 504 determines the order of magnitude of input values IN0 to IN2, and applies a signal 517 representing the result of determination to each of selectors 505 to 507. Selectors 505 to 507 outputs, in accordance with the input signal 517, output values (pixel values) OUT0 to OUT2 from input values IN0 to IN2, respectively. Here, the output values satisfy the relation of OUT0>OUT1>OUT2.

Referring to FIG. 1, maximum value determiner 210 compares the input maximum pixel values 220 to 222, determines the largest pixel value among the pixel values 220 to 222, determines the group including the determined largest pixel value, and outputs a signal 229 representing the result of determination to each of data shift circuits 207 to 209.

Here, the signal 229 indicates groups that include the largest and the second largest pixel values among the maximum pixel values of groups 201 to 203. Signal 229 corresponds to a shift signal 404 that will be described later. The signal 229 is applied as an ON level signal to data shifters of the groups including the largest and the second largest pixel values, while the signal 229 is applied as an OFF level signal to the data shifter corresponding to the other group.

Figure 4:
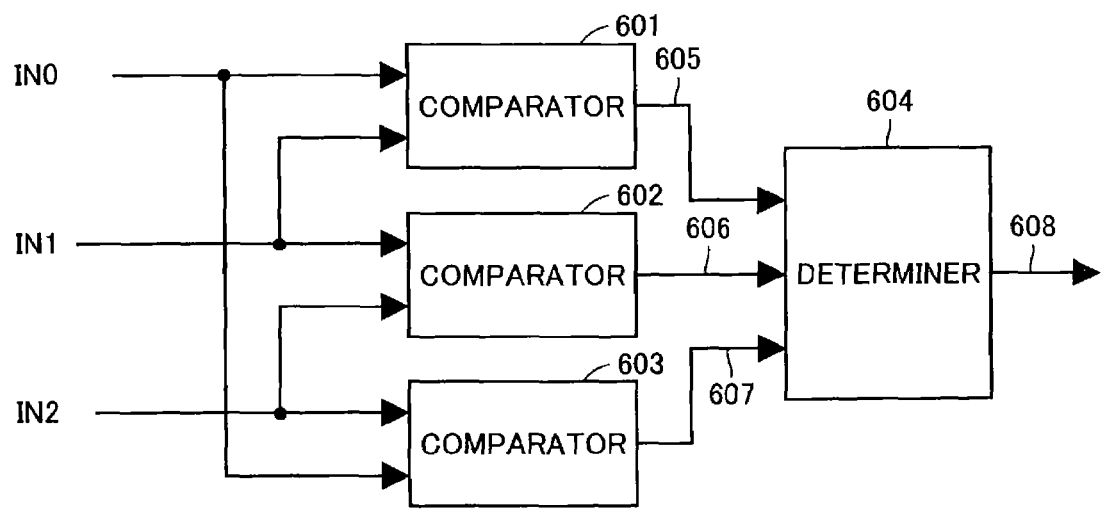
FIG. 4 represents a configuration of a maximum value determiner in accordance with the first embodiment.

The maximum value determiner in accordance with the present embodiment shown in FIG. 4 has such a configuration that corresponds to the configuration of the sorter shown in FIG. 3 with the selector removed, so as to perform only the determination of magnitude of the input values. Specifically, the determiner has comparators 601 to 603 and a determiner 604. Among three input values (that is, maximum pixel value of each of the groups) IN0 to IN2, input values IN0 and IN1 are applied to comparator 601, IN1 and IN2 are applied to comparator 602, and IN0 and IN2 are applied to comparator 603. Comparators 601 to 603 compare the two input values, and outputs signals 605 to 607 representing the results of comparison to determiner 604, respectively. Based on the input signals, determiner 604 determines the magnitude order of input values IN0 to IN2, and outputs a signal 608 representing the result of determination.

Referring to FIG. 1, when the three pixel values as the results of sorting input from sorters 204 to 206 include the pixel value represented by the signal 229 input from maximum value determiner 210, that is, the largest (maximum) pixel value or the second largest pixel value among the nine pixel values of the input data 100, data shift circuits 207 to 209 perform shifting operation on the three pixel values as the results of sorting. Data shift circuits 207 to 209 output respective shift results 223 to 225 to data shift circuits 211 to 213 of the next stage, respectively. Further, data shift circuits 207 to 209 output the new maximum pixel value represented by the results of shifting to maximum value determiner 214.

Figure 5:
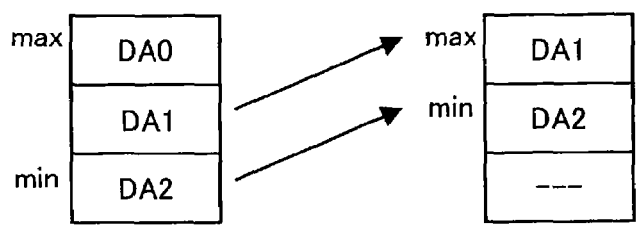
FIG. 5 is an illustration of the shifting operation by a data shifter in accordance with the first embodiment.

The shifting operation by the data shifter in accordance with the present embodiment will be described with reference to FIG. 5. The data shifter has a function of a shift register. Specifically, it receives the applied pixel value, stores the same temporarily, and outputs. At this time, the shifter performs a shifting operation as needed on the stored pixel value and thereafter outputs the result. The shifting operation here refers to an operation in which from the plurality of input values as the results of sorting, the maximum value is removed, and the values of the second and the following order are carried (advanced). In the example shown in FIG. 5 from data DA0 to DA2 as the results of sorting, data DA0 of the maximum value is removed, data DA1 and DA2 are carried and thus the maximum value is updated to data DA1.

Figure 2D:
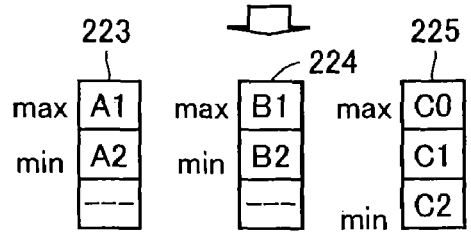
Figure 2E:
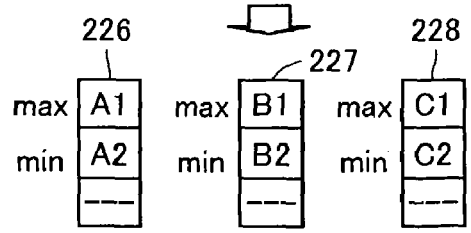

As to the results of shifting 223 to 225 described above, the largest pixel value A0 and the second largest pixel value B0 represented by signal 229 are removed, and pixel values A1, A2 and B1 and B2 are carried (advanced in order), as shown in FIG. 2D. In this example, for simplicity of description, it is assumed that groups 201 and 202 include the largest and the second largest pixel values, respectively.

Figure 6:
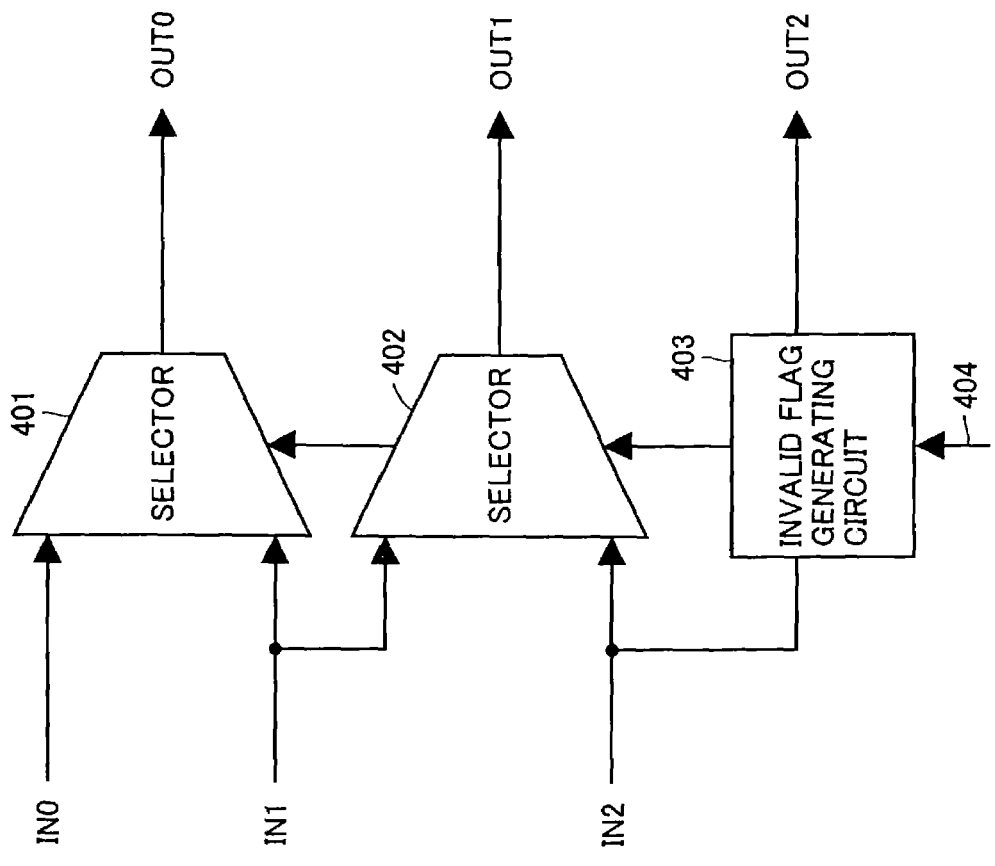
FIGS. 6A and 6B represent an exemplary configuration of a data shifter and a signal table for the shifting operation in accordance with the first embodiment.

FIG. 6A represents an exemplary configuration of a data shifter in accordance with the present embodiment, and FIG. 6B represents, in the form of a table, the relation between the signals for the shifting operation. Referring to FIG. 6A, the data shifter has selectors 401 and 402, and an invalid flag generating circuit 403 receiving a shift signal 404 representing the result of determination output from the maximum value determiner. Shift signal 404 is 'ON' when instructing a shifting operation, and otherwise it is 'OFF'.

In operation, among three input values IN0 to IN2 applied from the preceding stage, input values IN0 and IN1 are applied to selector 401, and input values IN1 and IN2 are applied to selector 402. Further, input value IN2 is applied to invalid flag generating circuit 403. When the shift signal 404 is OFF, shifting operation is not performed, and therefore, input values IN0 to IN2 are directly output as output values OUT0 to OUT2, as can be seen from the table of FIG. 6B. When the shift signal 404 is ON, input value IN0 is removed, and input values IN1 and IN2 are advanced in order. At this time, as the order of input value IN2 is carried, the input value corresponding to output value OUT2 is lost. Consequently, an invalid flag is generated by invalid flag generating circuit 403, and the generated invalid flag is set at the output value OUT2.

Referring to FIG. 1, maximum value determiner 214 receives signals 223 to 225 as the result of shifting of groups 201 to 203, compares maximum pixel values represented by signals 223 to 225 with each other, determines the largest among the three maximum pixel values, determines the group that includes the largest pixel value, and outputs a signal 230 representing the result of determination to each of data shifters 211 to 213. Here, signal 230 represents the group that includes the determined largest pixel value. Therefore, among the data shifters 211 to 213, the above described shift signal 404 that is ON is applied to the data shifter corresponding to the group including the determined largest pixel value, while the signal 404 that is OFF is applied to the data shifters corresponding to other groups.

When the shifting operation is instructed by signal 230 (shift signal 404), each of the data shift circuits 211 to 213 performs a shifting operation further on the pixel values of the corresponding group that have been already shifted in the preceding stage. The results 226 to 228 of the shifting operation by data shift circuits 211 to 213 are output to data shifters 215 to 217 of the next stage, respectively. Further, data shift circuits 211 to 213 output the new maximum pixel values as the results of shifting to a maximum value determiner 218, respectively. In the shift results 226 to 228 shown in FIG. 2E, the largest pixel value C0 has been removed, and the order of the second and the following pixel values C1 and C2 are advanced. In this example, for the simplicity of description, it is assumed that group 203 includes the largest pixel value C0.

Maximum value determiner 218 compares the received three pixel values with each other, and determines which is the largest. Then, the group including the largest pixel value is determined, and the signal 231 representing the result of determination is output to data shifters 215 to 217. Here, the signal 231 represents the group that includes the determined largest pixel value.

Figure 2F:
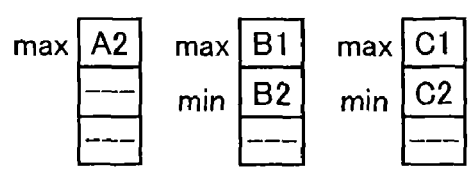
Figure 2G:
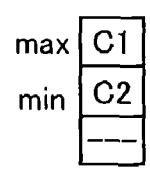

Data shifters 215 to 217 receive the results of shifting of the preceding stage, respectively, and when the shifting operation is instructed as indicated by the shift signal 404 corresponding to signal 231 applied from maximum value determiner 218, perform a shifting operation on the pixel values represented by the input results of shifting. Only the maximum pixel values represented by the results of shifting of data shifters 215 to 217 are output to sorter 219. Sorter 219 simply determines the largest pixel value among the input pixel values, and therefore, it is unnecessary to apply to sorter 219 all the pixel values as the results of shifting. In the result of shifting, the largest pixel value A1 is removed and the second largest pixel value A2 is advanced, as shown in FIG. 2F. In this example, for convenience of description, it is assumed that group 201 includes the maximum pixel value. To sorter 219, only the maximum pixel value as the result of shifting of each group is applied. In this example, the maximum pixel values applied to sorter 219 are A2, B1 and C1.

Sorter 219 receives the maximum pixel values of respective groups, sorts the received values and outputs the largest among these values as the median (central value) 101.

Figure 15:
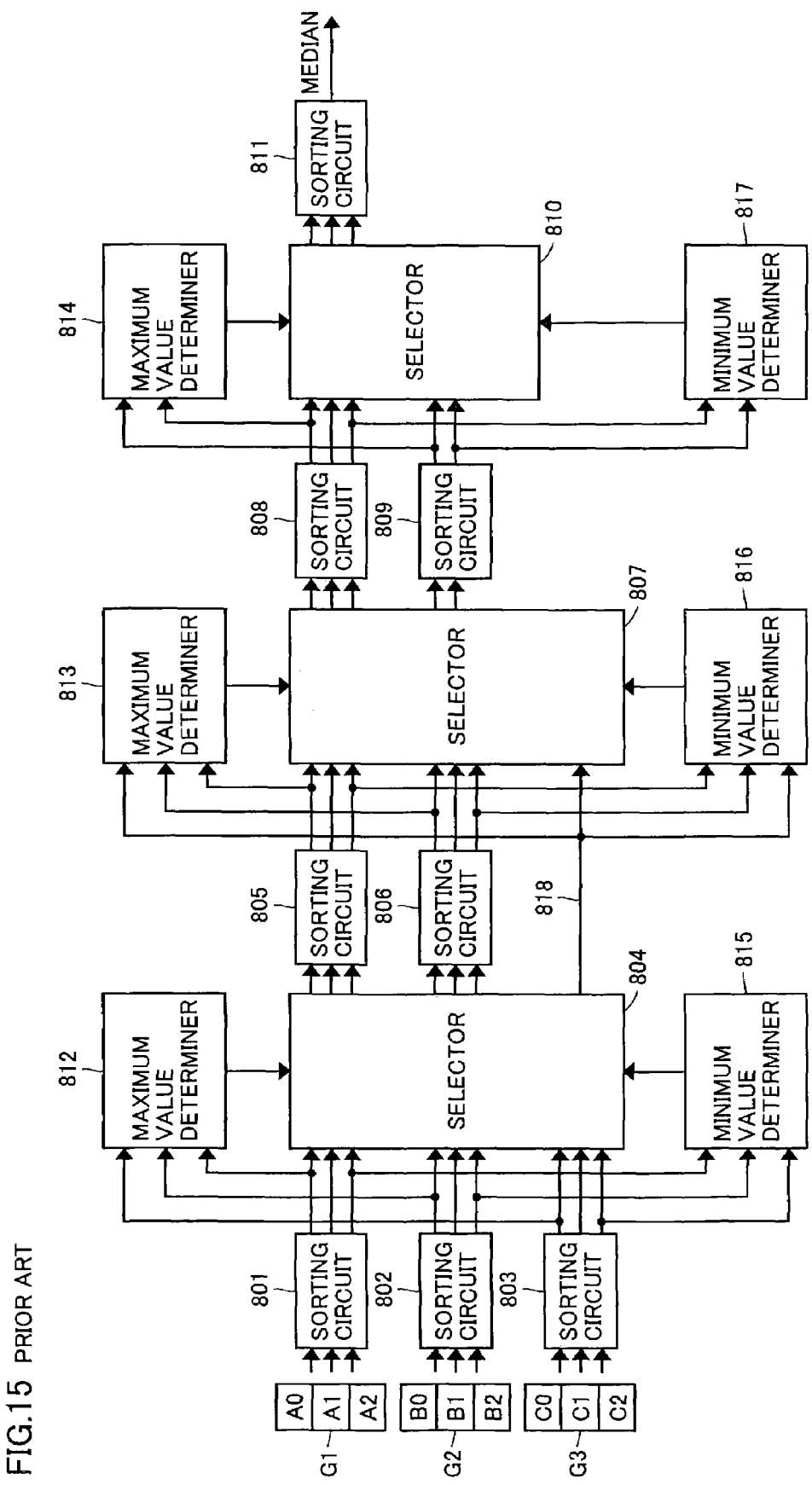
FIG. 15 represents an exemplary configuration of a conventional median filtering apparatus.

Here, the configuration of FIG. 1 includes four sorters and three maximum value determiners, with the number of comparators included in the configuration being 21 in total. As compared with the conventional configuration shown in FIG. 15 that requires 36 comparators, the number of comparators can significantly be reduced.

In the configuration shown in FIG. 1, nine pixel values arranged in a two-dimensional local area of 3*3 of an image are input to input circuit 200, and from the nine input pixels, the first to 4th pixel values sorted in accordance with a prescribed order are removed, and from the remaining five pixel values, the first pixel value sorted in accordance with the prescribed order is output as the median 101, using sorters 204 to 206 and 219, data shifters 207 to 209, 211 to 213 and 215 to 217, and maximum value determiners 210, 214 and 218.

Here, utilizing maximum value determiners 210, 214 and 218, the maximum value is removed by shifting. In place of the maximum value determiners, minimum value determiners may be used to remove the minimum value by shifting. When the minimum value determiners are used, the 6th to 9th pixel values sorted in accordance with a prescribed order should be removed, and from the remaining five pixel values, the 5th pixel value sorted in accordance with the prescribed order should be output as median 101. The prescribed order is either the ascending order or the descending order.

Though nine pixel values are input in the first implementation, the number of pixel values to be input is not limited to nine. Specifically, the present invention is generally applicable to N pixel values arranged in a two-dimensional local area of K*K (K is an odd number not smaller than 3) of a digitized image. When maximum value determiners are used for N pixel values, the operation is as follows. N pixel values are input, from the input N pixel values, the first to ((N-1)/2)th pixel values as sorted in accordance with a prescribed order are removed, and among the remaining (N-(N-1)/2) pixel values, the first pixel as sorted in accordance with the prescribed order is output as the median. When minimum value determiners are used in place of maximum value determiners, the operation is as follows. N pixel values are input, from the input N pixel values, ((N-1)/2+2) to Nth pixel values as sorted in accordance with a prescribed order are removed, and among the remaining (N-(N-1)/2) pixel values after removal, the (N-(N-1)/2)th pixel value as sorted in accordance with the prescribed order is output as the median.

Second Exemplary Implementation of the Median Filtering Apparatus

An implementation will be described in the following, in which the above described median filtering process is executed in parallel. Here, by way of example, four such median filtering processes as described above are performed in parallel. For performing four processes in parallel, it is necessary to perform the processes on adjacent four windows simultaneously.

Figure 7:
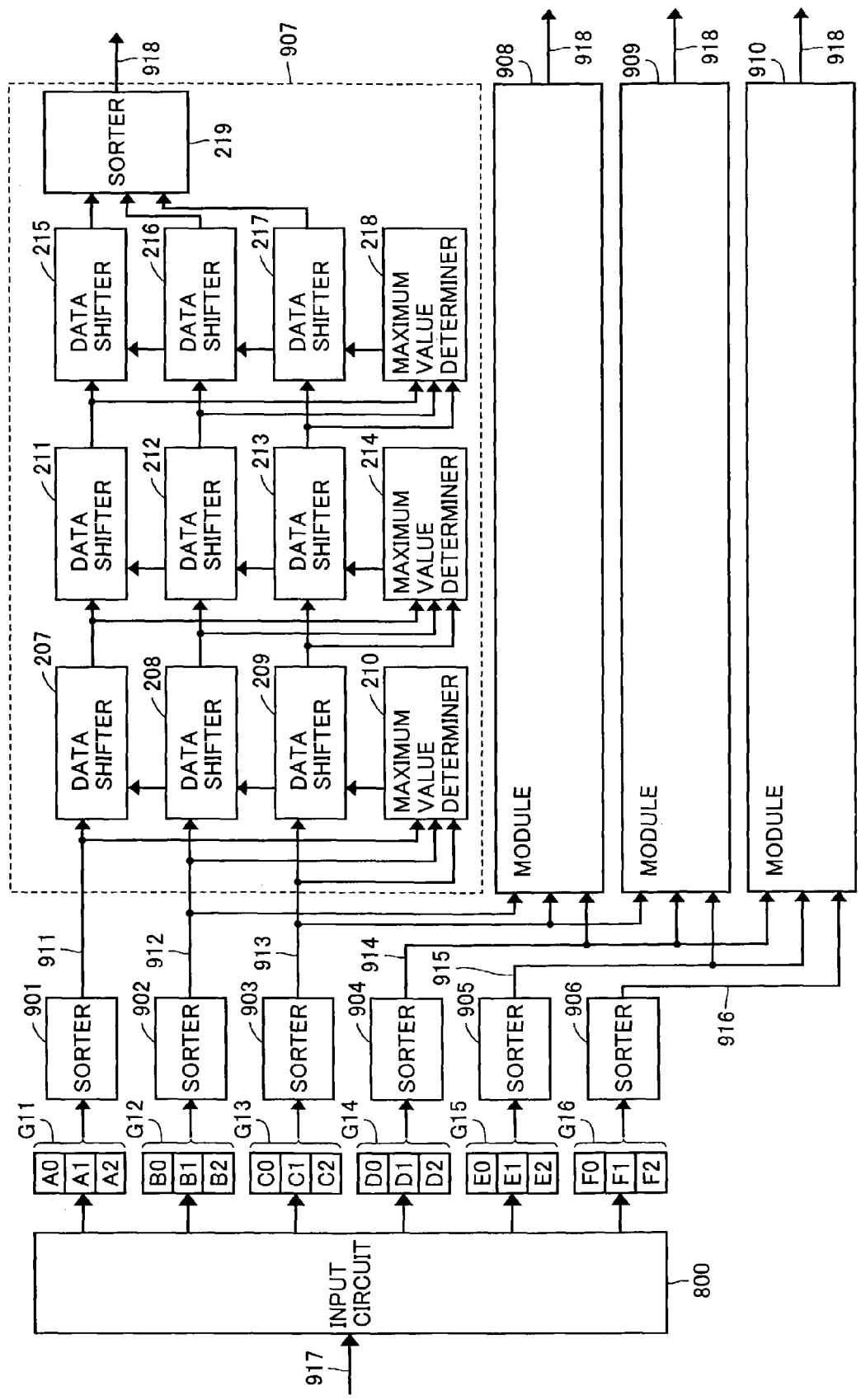
FIG. 7 represents an exemplary hardware implementation of another median filtering apparatus in accordance with the first embodiment.
Figure 8:
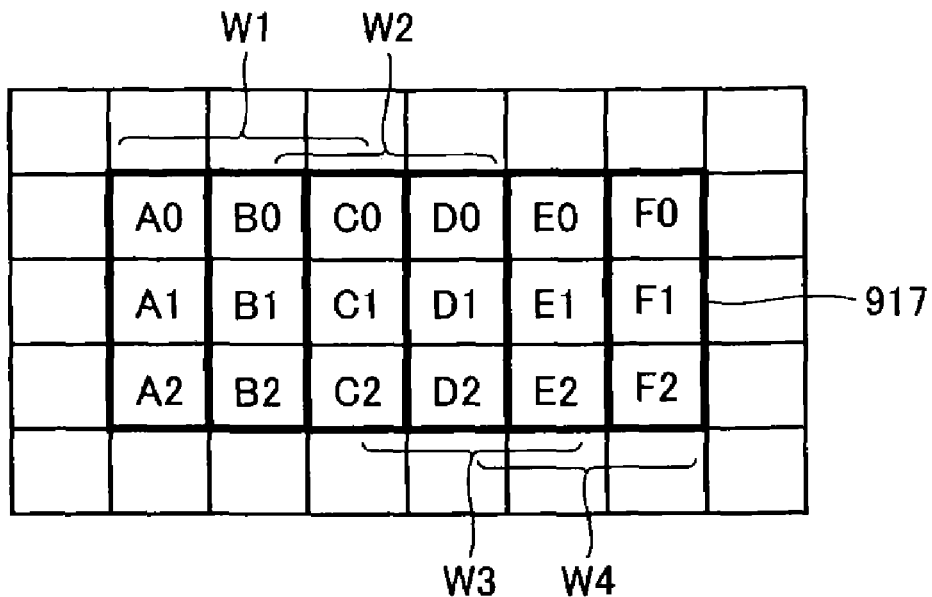
FIG. 8 represents an example of image data as input data to the median filtering apparatus shown in FIG. 7.

FIG. 7 represents the other exemplary hardware configuration of the median filtering apparatus in accordance with the present embodiment. FIG. 8 shows an example of image data 917 as the input data to the median filtering apparatus of FIG. 7.

Image data 917 of FIG. 8 shows that four windows W1 to W4 each having the size of 3×3 are positioned side by side. The median filtering apparatus shown in FIG. 7 outputs, for each of the windows of image data 917 shown in FIG. 8, the central value of the nine pixel values of the window as median 918.

The median filtering apparatus of FIG. 7 includes an input circuit 800, sorters 901 to 906 provided corresponding to groups G11 to G16, respectively, as will be described later, and modules 907 to 910 corresponding to windows W1 to W4, respectively. Modules 907 to 910 have the same configuration, and specifically, each module has the data shifters 207 to 217, maximum value determiners 210, 214 and 218, and the sorter 219 shown in FIG. 1. In FIG. 7, the configuration of module 907 is shown as a specific representative, and configurations of modules 908 to 910 are not specifically shown.

In operation, when image data 917 is applied, input circuit 800 receives the image data 917, and divides the input data to 6 groups G11 to G16, each consisting of three pixels. Groups 11 to 13 form window W1, groups G12 to G14 form window W2, groups G13 to G15 form window W3 and groups G14 to G16 from window W4.

Groups G11 to G16 are applied to sorters 901 to 906, respectively, and each of sorters 901 to 906 sorts the three pixel values of the applied group. Results of sorting 911 to 913 corresponding to window W1 output from sorters 901 to 903 are output to module 907 corresponding to window W1, results of sorting 912 to 914 corresponding to window W2 output from sorters 902 to 904 are output to module 908 corresponding to window W2, results of sorting 913 to 915 corresponding to window W3 output from sorters 903 to 905 are output to module 909 corresponding to window W3, and results of sorting 914 to 916 corresponding to window W4 output from sorters 904 to 906 are output to module 910 corresponding to window W4, respectively.

Modules 907 to 910 receive the applied results of sorting, perform the median filtering process as described with reference to FIG. 1, to calculate the central values for corresponding windows W1 to W4, respectively, and output the central values as medians 918.

Here, when median filtering process is performed in parallel on the adjacent four windows W1 to W4, groups G13 and G14 belong to three windows, and hence, the results of sorting of groups G13 and G14 are used for the median filtering process of three modules. As the results of sorting are shared among adjacent windows, the number of sorters used for the four parallel operations shown in FIG. 7 is only 6. When the results of sorting art not shared, the necessary number of sorters is 12, and hence, the circuit scale of the median filtering apparatus can significantly be reduced by the configuration in which the results of sorting are shared among adjacent windows as shown in FIG. 7.

Second Embodiment

It is desirable that the median filtering process involving parallel operations such as described above is executed by a data driven type operating apparatus suitable for parallel processing. In the present embodiment, a data driven type information processing apparatus having the above described median filtering apparatus mounted will be described. When the median filtering apparatus is mounted on the data driven type information processing apparatus, the data driven type information processing apparatus will be the main body of an image processing apparatus.

When high speed processing of a large amount of data such as image data is desired, parallel processing is advantageous. Among architectures suitable for parallel processing, the data driven type architecture is particularly notable. In the data driven type processing method, processes proceed in accordance with the rule that "when all input data necessary for a certain process are prepared and resources such as an operating apparatus necessary for that process are allocated, the process starts."

Figure 9:
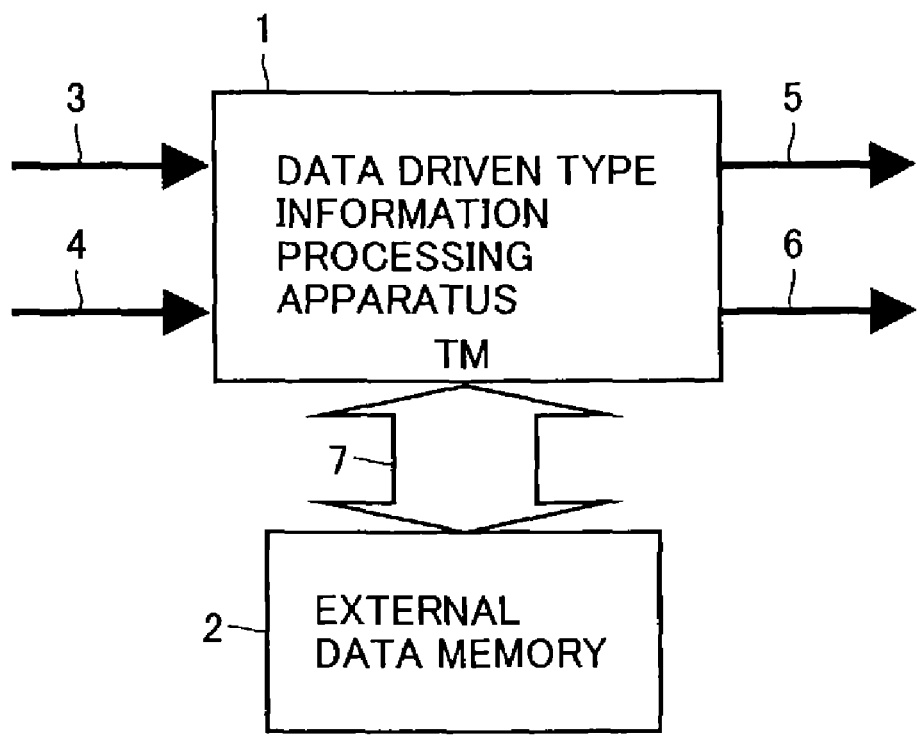
FIG. 9 is an illustration of the data driven type processing system in accordance with a second embodiment.
Figure 10:
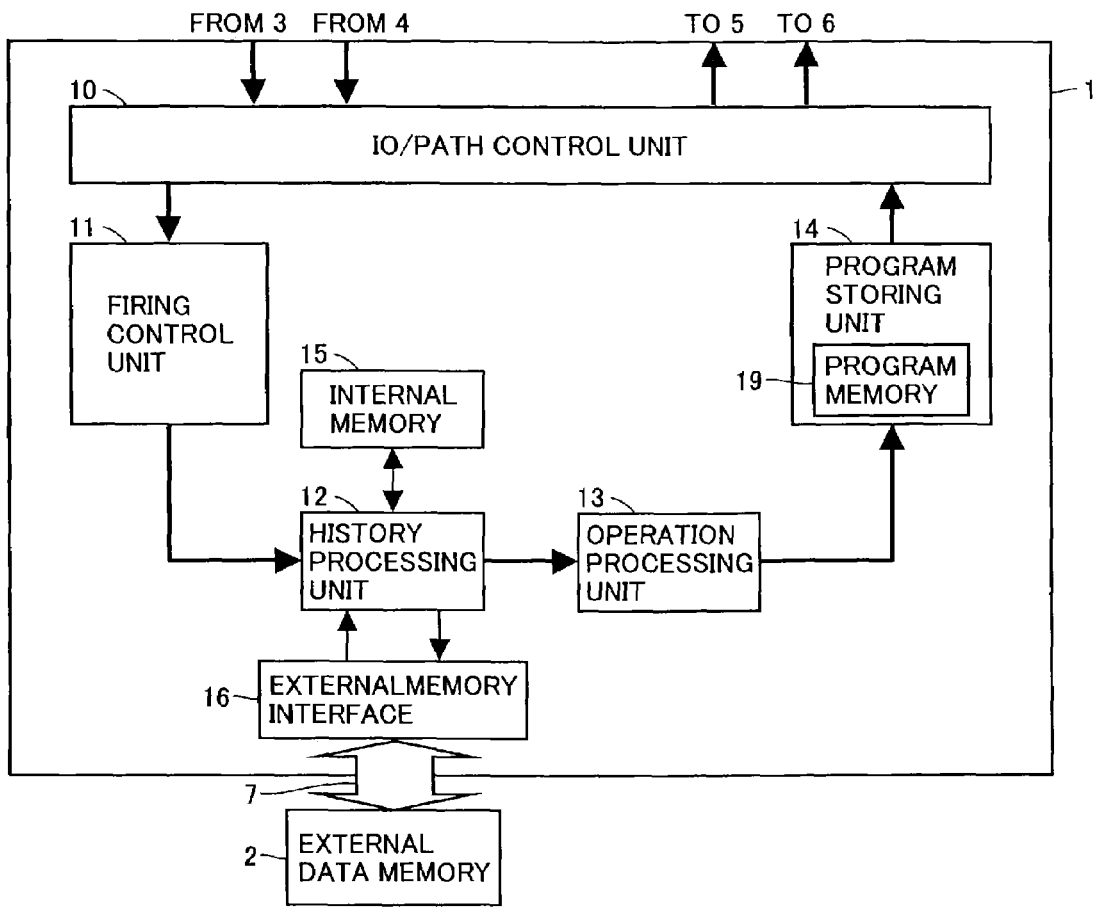
FIG. 10 shows a configuration of the data driven type information processing apparatus.
Figure 11:
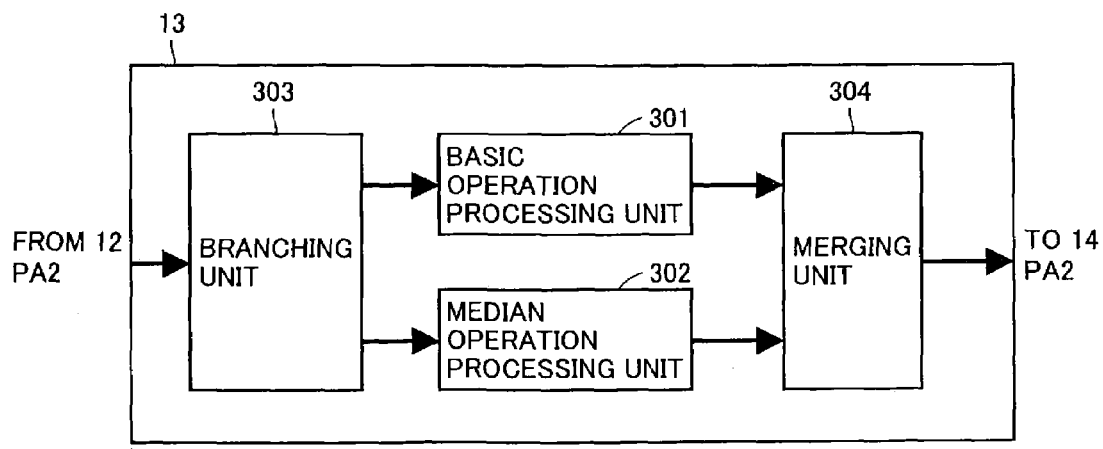
FIG. 11 shows a configuration of the operation processing unit in accordance with the second embodiment.

FIG. 9 shows a configuration of the data driven type processing system in accordance with the second embodiment of the present invention, FIG. 10 shows a configuration of data driven type information processing apparatus 1 in accordance with the second embodiment, FIG. 11 shows a configuration of an operation processing unit 13 in accordance with the second embodiment of the present invention, and FIGS. 12A to 12C show field arrangements of packets PA, PA1 and PA2 applied to the second embodiment of the present invention.

The data driven type information processing system shown in FIG. 9 includes data driven type information processing apparatus 1 and an external data memory 2 in which a plurality of data are stored. Data transmission paths 3 and 4 are connected to the data input side and data transmission paths 5 and 6 are connected to the data output side of data driven type information processing apparatus 1, and an access control line 7 is further connected for the access to the external data memory 2.

To data driven type information processing apparatus 1, packet PA is time-sequentially input from data transmission path 3 or 4. In data driven type information processing apparatus 1, a prescribed process contents are stored in advance as a program, and processes in accordance with the program are executed.

When an access (reference/updating of contents in external memory 2) request signal from data driven type information processing apparatus 1 is received through access control line 7, external data memory 2 accesses in accordance with the received access request, and responds to data driven type information processing apparatus 1 by providing the result.

Data driven type information processing apparatus 1 performs processing of the input packet PA, and after the end of the processing, outputs the packet PA storing the result of processing through data transmission path 5 or 6.

Data driven type information processing apparatus 1 includes an input-output/path control unit 10, a firing control unit 11, a history processing unit 12 to which an internal memory 15 and an external memory interface 16 are connected, an operation processing unit 13 and a program storing unit 14. Program storing unit 14 includes a program memory 19 necessary for performing the data driven type processing. As shown in FIG. 11, operation processing unit 13 includes a basic operation processing unit 301, a median operation processing unit 302 having the configuration shown in FIG. 1 or 7, a branching unit 303 and a merging unit 304. Here, it is assumed that image data as the object of median filtering process is stored in advance in internal memory 15 or external data memory 2.

FIG. 12A represents a basic configuration of an input/output packet PA of data driven type information processing apparatus 1, and FIGS. 12B and 12C represent basic configurations of packets PA1 and PA2 circulating in data driven type information processing apparatus 1. Packet PA1 shown in FIG. 12B flows through input-output/path control unit 10, firing control unit 11 and program storing unit 14. Packet PA2 shown in FIG. 12C flows through history processing unit 12 and operation processing unit 13.

Packet PA of FIG. 12A includes a field 20 storing a PE number (Processing Element Number; processor number) PE, a field 22 storing a node number ND, a field 23 storing a generation number GE, and a field 24 storing data D. Packet PA1 of FIG. 12B includes fields 22 to 24 similar to those of FIG. 12A, and a field 21 storing an instruction code OP. Packet PA2 of FIG. 12C includes fields 21 to 23 similar to those of FIG. 12B, a field 25 storing left data LD and a field 26 storing right data RD.

Referring to FIGS. 12A to 12C, processor number PE represents information for identifying a data driven type information processing apparatus 1 by which the corresponding packet PA is to be processed, in a system having a plurality of data driven type information processing apparatuses 1 connected thereto. Node number ND is used as an address to access to the contents of program memory 19. Generation number GE is used as an identifier for uniquely identifying packets time-sequentially input to data driven type information processing apparatus 1, and also used for memory address calculation in history processing unit 12.

In operation, when packet PA of FIG. 12A is applied to the data driven type information processing apparatus 1 designated by processor number PE through data transmission path 3 or 4, input-output/path control unit 10 receives as an input the packet PA, generates packet PA1 based on the contents of packet PA, and outputs packet PA1 to firing control unit 11.

Firing control unit 11 receives as an input the applied packet PA1, and detects a packet PA1 to be paired. Detection of a packet to be paired is referred to as "firing". When fired, of the two packets PA1 having the same node number ND and same generation number GE, that is, two different packets PA1 forming a pair, data D in field 24 of one packet PA1 is stored in field 25 of packet PA2 of FIG. 12C, data D in field 24 of the other packet PA1 is stored in field 26 of packet PA2, and thereafter, packet PA2 is output to history processing unit 12. At this time, one packet PA is discarded. It is noted that instruction code OP, node number ND and generation number GE are not changed at firing control unit 11.

History processing unit 12 receives as an input the packet PA2 from firing control unit 11, decodes instruction code OP of input packet PA2, and based on the result of decoding, performs a prescribed processing. When instruction code OP represents an internal memory access instruction, internal memory 15 is accessed, and packet PA2 storing the result of access in field 25 or 26 is output to operation processing unit 13.

When instruction code OP represents an external data memory access instruction, an access request packet is applied to external memory interface 16. In accordance with the contents of the received access request packet, external memory interface 16 accesses to external data memory 2 through memory access control line 7, receives the result of access, and outputs a data packet having the received result of access stored therein to history processing unit 12. As a result, packet PA2 indicating an external data memory access instruction is output to operation processing unit 13 with the result of access to external data memory 2 stored in field 25 or 26.

By way of example, when instruction code OP represents a median filtering process, a memory area corresponding to a window having the size of 3×3 of external data memory 2 is accessed and processed, and packet PA2 having the result of the access stored in its field 25 or 26 is output to operation processing unit 13. When instruction code OP represents an instruction not related to history processing unit 12, packet 12 is not operated and output as it is to operation processing unit 13.

In operation processing unit 13, branching unit 303 receives the applied packet PA2, refers to the instruction code OP of the input packet PA2, outputs packet PA2 to median operation processing unit 302 when the instruction code OP represents a median filtering process, and outputs the packet PA2 to basic operation processing unit 301 when the instruction code represents other operation processing. Median operation processing unit 302 executes a median filtering process on the image data stored in field 24 of packet PA2. Basic operation processing unit 301 executes processes other than the median filtering process on the contents of packet PA2. Merging unit 304 successively receives as inputs the packet from median operation processing unit 302 and packet from basic operation processing unit 301, and outputs to program storing unit 14.

In median operation processing unit 302, a circuit corresponding to input circuit 200 divides N pixel values in field 24 of applied packet PA2 into K groups each consisting of K pixel values, and a packet PA2 having the pixel values after division stored in field 24 is generated. The generated packet is passed through circuits that correspond to a plurality of sorters and to a plurality of data shifters as shown in FIG. 1, and hence, the first to ((N-1)/2)th pixel values as sorted in accordance with a prescribed order are removed. The packet that has passed through these circuits has the (N-(N-1)/2) pixel values, with the pixel values mentioned above removed, stored in field 24. Eventually, by a circuit corresponding to sorter 219 shown in FIG. 1, a packet is generated and output, in which the first pixel value as sorted in accordance with the prescribed order among the (N-(N-1)/2) pixel values of the packet is stored as the median in field 24.

When a circuit corresponding to the circuit shown in FIG. 7 is applied to median operation processing unit 302 and a packet PA2 having pixel values of image data 917 stored in field 24 is input to a circuit corresponding to input circuit 800, a packet PA2 is generated and output, in which the pixel values divided into 6 groups each consisting of K pixel values are stored in field 24. The contents of field 24 of packet PA2 are sorted by circuits corresponding to sorters 901 to 906.

Thereafter, contents of field 24 of packet PA2 are applied to a circuit corresponding to the module of the corresponding window. Each module receives as an input the packet PA2 having N pixel values included in the corresponding window, and removes the pixel values while performing shifting in the same manner as described above, to extract the median. The median 918 is stored in the data field of packet PA2 and the packet PA2 is output.

In program memory 19 of program storing unit 14, a data flow program including a plurality of subsequent instruction codes OP and a plurality of subsequent node numbers ND is stored in advance. The pre-stored instruction codes include an instruction code representing the median filtering process. Program storing unit 14 receives as an input the applied packet PA1, reads the subsequent node number and the subsequent instruction code OP from program memory 19 in accordance with an address designation based on the node number ND of the input packet PA1, stores the read node number ND and instruction code OP to fields 21 and 22 of the input packet PA1, respectively, and outputs the packet PA1 to input-output/path control unit 10. At program storing unit 14, generation number GE and data D are not changed.

Input-output/path control unit 10 receives as an input the applied packet PA1, and based on the instruction code OP and node number ND of the input packet PA1, determines whether the contents of the packet PA1 should be executed inside or outside of data driven information processing apparatus 1. Based on the result of determination, packet PA1 is output to the outside through transmission path 5 or 6, or output to firing control unit 11.

In this manner, the process in accordance with the program including an instruction code of the median filtering process stored in program memory 19 is executed in parallel, as the packet circulates within data driven type information processing apparatus. Thus, even when the image data as the object of the median filtering process is large, high speed processing is possible.

Third Embodiment

In the embodiments described above, the median filtering process is implemented by hardware or by a data driven type information processing apparatus. The process, however, may be implemented by a software that can be executed by a Neumann type information processing apparatus, as will be described in present embodiment.

Figure 13A:
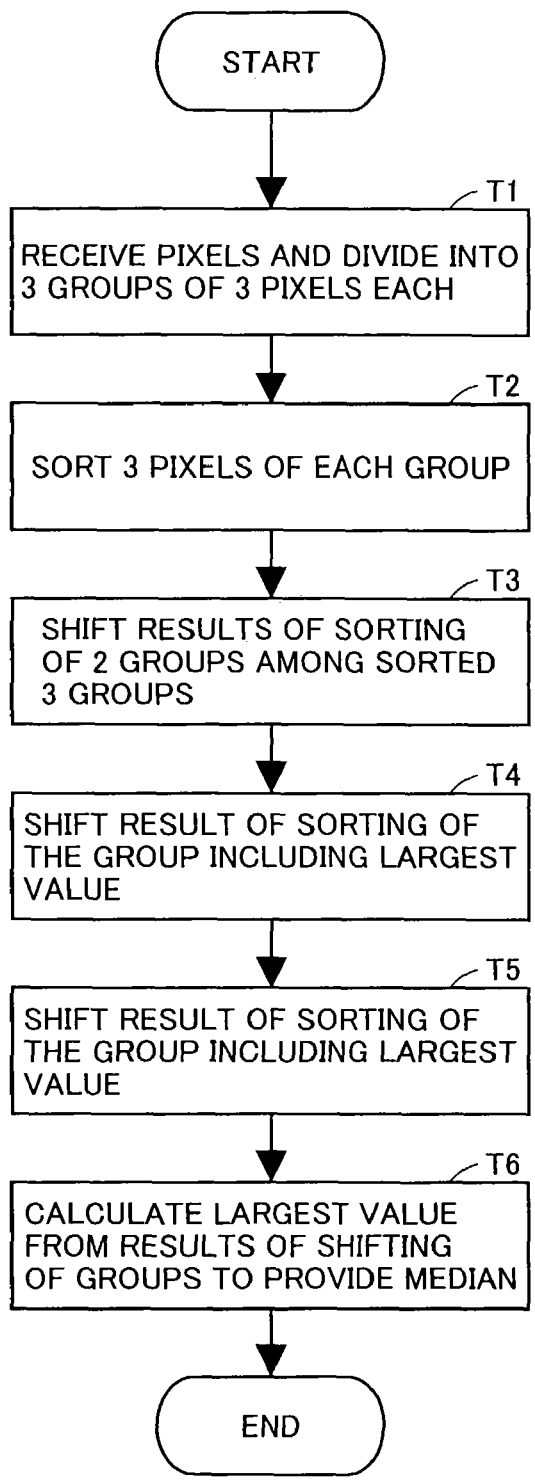
FIGS. 13A and 13B are flow charts of the median filtering process in accordance with a third embodiment.
Figure 13B:
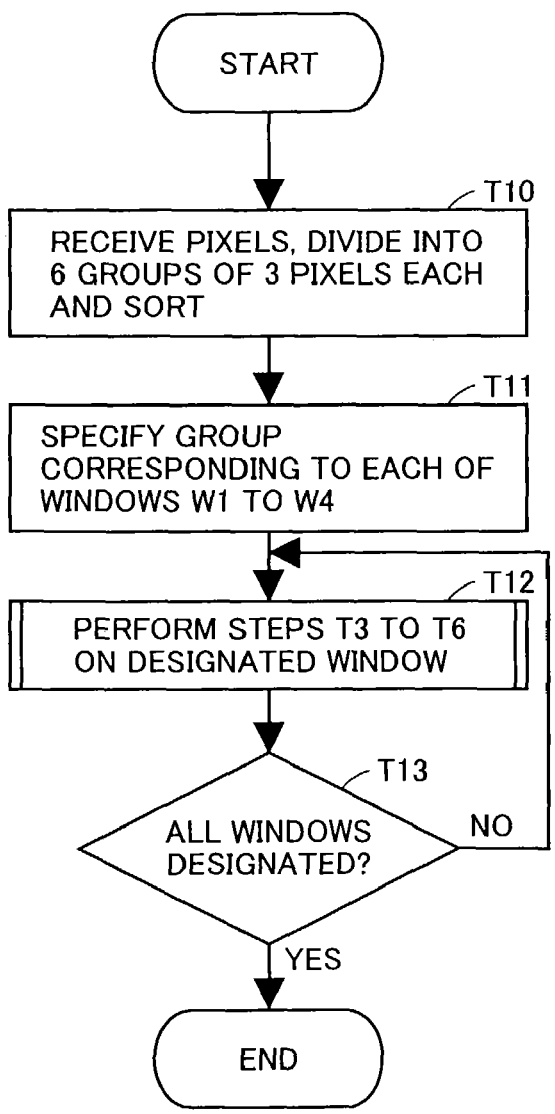

FIGS. 13A and 13B are flow charts of median filtering process in accordance with the third embodiment, representing procedures when the function of the median filtering apparatuses of FIGS. 1 and 7 is executed by a program.

Figure 14:
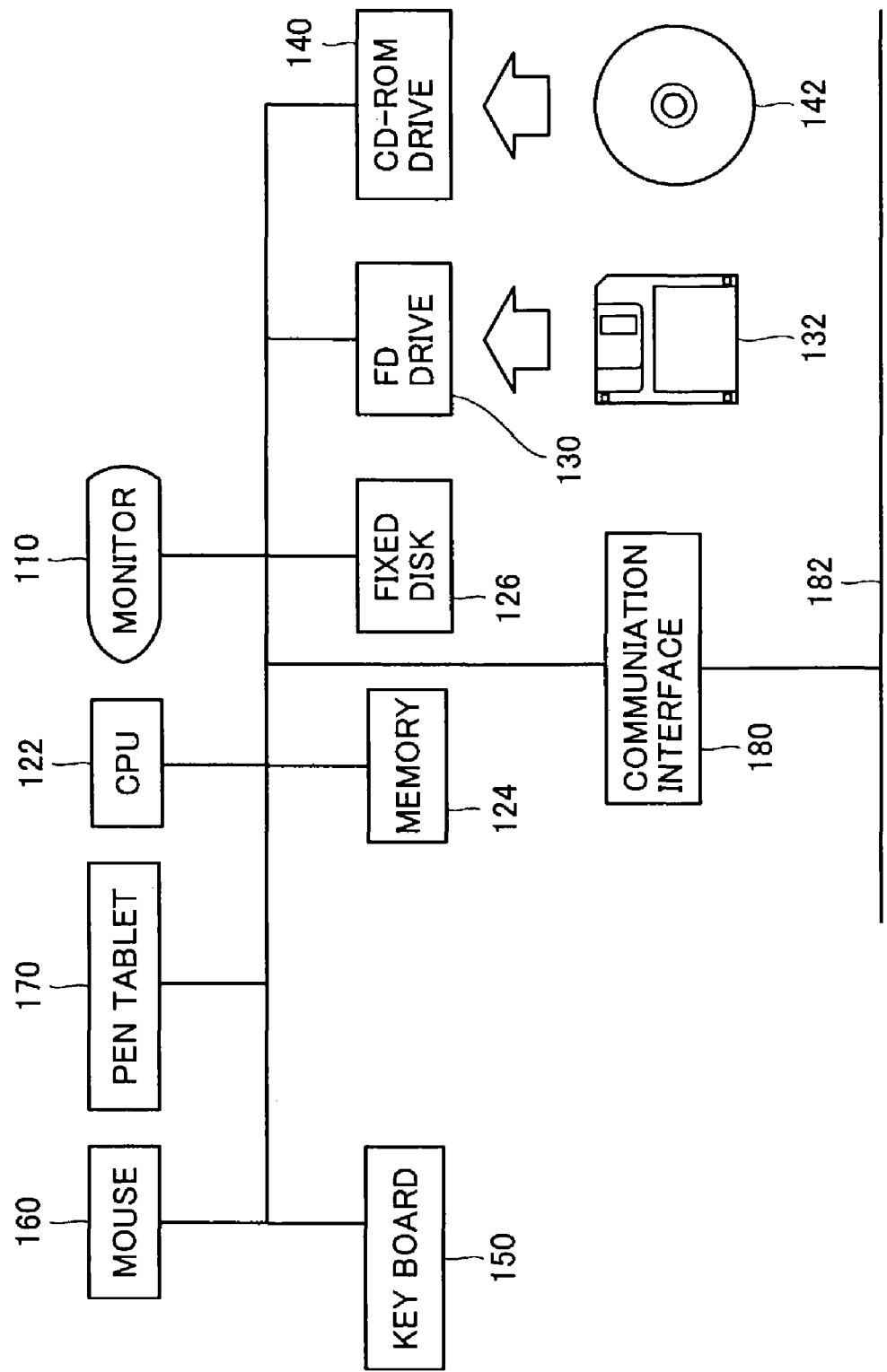
FIG. 14 represents a configuration of a computer in accordance with the third embodiment.

FIG. 14 shows a configuration of a computer in accordance with the third embodiment of the present invention. The computer shown in FIG. 14 includes a monitor 110 such as a CRT (Cathode Ray Tube), a key board 150, a mouse 160, a pen tablet 170, a CPU (Central Processing Unit) 122 for centralized control of the computer itself, a memory 124 including an ROM (Read Only Memory) or an RAM (Random Access Memory), a fixed disk 126, an FD drive 130 accessing to an FD (Flexible Disk) 132 detachably mounted thereto, a CD-ROM drive 140 accessing to a CD-ROM (Compact Disc Read Only Memory) detachably mounted thereto, a communication network 182, and a communication interface 180 for communicating and connecting with the computer. These components are connected for communication through buses.

The computer may further include a magnetic tape apparatus accessing to a cassette type magnetic tape detachably mounted thereto.

Referring to the flow chart of FIG. 13A, the procedure of calculating the central value (median) of the nine pixel values in the window having the size of 3×3 of the image data as the object of processing will be described. It is assumed that the image data as the object of processing are stored in advance in memory 124.

In step T1, CPU 122 reads and receives as inputs the nine pixel values in the afore-mentioned window from the image date in memory 124, and divides the input nine pixel values into three groups each consisting of a column of three pixels. In step T2, for each of the three groups prepared by the division of step T1, the three pixel values in each group are sorted in accordance with a prescribed order (ascending order or descending order).

In step T3, the results of sorting of the three groups obtained in step T2 are temporarily stored, and the maximum values of respective stored groups are compared with each other. Based on the result of comparison, the largest and the second largest among the three maximum values are determined. The result of sorting of the group including the thus determined largest value and the result of sorting of the group including the thus determined second largest value are shifted. The shifting operation here refers to an operation in which, from the result of sorting of a group, the maximum value is removed, the second and the following values are advanced and thus obtained new order is provided as the result of sorting. By this shifting operation, in each of the groups including the largest and the second largest values, the first pixel value is removed and the second and the following values are advanced in order.

In step T4, the results of shifting of step T3 are input and temporarily stored, and the maximum values of respective stored groups are compared with each other. Based on the result of comparison, the largest among the three maximum values is determined. The result of sorting of the group including the thus determined largest value is shifted. By this shifting operation, in the group that is the object of shifting, the maximum value is removed and the second and the following values are advanced in order.

In step T5, storing, determining and shifting operations similar to those performed in step T4 are again performed on the result of shifting operation of step T4. In this manner, in steps T3 to T5, the procedure of storing pixel values, determining the magnitude, and shifting the stored pixel values based on the result of determination (determined pixel values are removed by shifting) is executed to remove the pixel values.

In step T6, based on the result of shifting of step T5, the maximum values of respective groups are sorted, and the largest value obtained as a result of sorting is output as the median of the nine input pixel values.

Here, the median of the input nine pixel values is the 5th value when the nine input values are sorted. By the operation of steps T3 to T5, largest four pixel values are removed from the input value and five pixel values remain. It follows that the largest among the five remaining value is the 5th value of the nine input values sorted, that is, the median.

In this example, the maximum values are removed by shifting in steps T3 to T5. In place of the maximum values, the minimum values may be removed by shifting. When the minimum values are to be removed, the 6th to 9th pixel values as sorted in accordance with a prescribed order are removed, and among the remaining five pixel values, the 5th value as sorted in accordance with the prescribed order may be determined as the median.

Though nine pixel values are input here, the number of pixel values to be input is not limited to nine. Specifically, the present invention is generally applicable to N pixel values arranged in a two-dimensional local area of K*K (K is an odd number not smaller than 3) of a digitized image. When maximum values are to be removed from N pixel values while performing shifting, the process of steps T3 to T5 is changed such that from the input N pixel values, the first to ((N-1)/2)th pixel values as sorted in accordance with a prescribed order are removed, and the process of step T6 is changed such that among the remaining (N-(N-1)/2) pixel values, the first pixel value as sorted in accordance with the prescribed order is provided as the median. When the minimum values are to be removed in place of the maximum values, the process of steps T3 to T5 is changed such that from the input N pixel values, the ((N-1)/2+2)th to Nth pixel values as sorted in accordance with the prescribed order are removed, and the process of step T6 is changed such that among the remaining (N-(N-1)/2) pixel values, the (N-(N-1)/2)th pixel value as sorted in accordance with the prescribed order is provided as the median.

FIG. 13B shows a flow chart corresponding to FIG. 7. Here, it is assumed that image data 917 of FIG. 8 is stored in advance in memory 124. Referring to FIG. 13B, in step T10, CPU 122 reads image data 917 from memory 124, divides the data into groups G11 to G16, and sorts the pixel values of each group in accordance with a prescribed order (ascending order or descending order). In step T11, three groups constituting windows W1 to W4 of FIG. 8 are specified among the groups G11 to G16. Thereafter, any one of the windows is designated. In step T12, for the designated window, the process of steps T3 to T6 shown in FIG. 13A is performed on the pixels of the specified three groups, to calculate median 918. Thereafter, in step T13, whether all the windows have been designated or not is determined. When all the windows have been designated (YES in T13), it follows that the median has been calculated for every window. Thus, the process is terminated. When there is any window that has not yet been designated (No in step T13), the process of step T12 is performed on that window.

Though it is assumed here that the image data as the object of processing has been stored in advance in memory 124, the data may be externally supplied by an FD 132 or through communication network 182.

Fourth Embodiment

The program in accordance with the flow chart of the third embodiment is stored in a computer readable recording medium.

According to the present embodiment, the recording medium may be a memory necessary for the computer shown in FIG. 14 to execute the process, for example, ROM itself of memory 124, a magnetic tape, not shown, that can be read when mounted on a magnetic tape apparatus, not shown, or it may be CD-ROM 142. In any case, the program stored in such a recording medium may be accessed and executed by CPU 122 or the program may be temporarily read from the recording medium, loaded to a prescribed storage area of the computer shown in FIG. 14, for example, the RAM of memory 124, and read from the prescribed storage area and executed by CPU 122. It is assumed that the program for loading is stored in advance in the computer.

The recording medium may be a medium formed separate from the main body of the computer and fixedly carrying the program. By way of example, the recording medium may be tapes including magnetic tapes and cassette tapes, discs such as magnetic discs including FD 132 and fixed disk 126 or optical discs including CD-ROM 142/MO(Magnetic Optical Disc)/MD(Mini Disc)/DVD(Digital Versatile Disc), cards such as IC cards (including memory cards)/optical cards, or semiconductor memories including mask ROM, EPROM (Erasable and Programmable ROM), EEPROM (Electrically EPROM) and flash ROM.

The computer shown in FIG. 14 is connectable to communication network 182 to which various communication networks including the Internet are applicable, and therefore, the recording medium may be one to which the program is downloaded from the communication network 182, that is, a recording medium that carries the program in a so called mobile (flux) manner. When the program is downloaded from the communication network 182, the downloading program is stored in advance in the computer or installed in the computer from a separate recording medium in advance.

The contents stored in the recording medium are not limited to the program, and data may be included.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A filtering apparatus calculating a median of N pixel values arranged in a two-dimensional area of K*K (K is an odd number not smaller than 3) of a digitized image, comprising:
   receiving means for receiving said N pixel values;
   removing means for removing, from said received N pixel values, first to ((N-1)/2)th pixel values as sorted in accordance with a prescribed order; and
   sorting means for outputting, among (N-(N-1)/2) pixel values remaining after removal of the pixel values by said removing means, first pixel value as sorted in accordance with said prescribed order as said median.

2. The filtering apparatus according to claim 1, wherein said prescribed order is either ascending order or descending order.

3. The filtering apparatus according to claim 1, wherein said receiving means includes
   dividing means for dividing said received N pixel values into K groups each consisting of K pixel values, and
   group sorting means, for each of said K groups obtained by the division by said dividing means, for receiving and sorting the pixel values of the group in accordance with said prescribed order and outputting to said removing means, said removing means including a plurality of cascade-connected pixel removing units for removing (N-1)/2 pixel values from said N pixel values;
   each of said pixel removing units includes
   a determining unit determining, among first pixel values in accordance with said prescribed order of respective ones of said K groups applied, at least one first and following pixel values in accordance with the prescribed order, and
   a shift storing unit receiving, temporarily storing and outputting said pixel values of said K groups; and
   said shift storing unit removes, in said group including said pixel value determined by said determining unit, said determined pixel value from said pixel values of the stored group, and shifts order of the second and the following pixel values remaining after the removal in accordance with said prescribed order before outputting.

4. A filtering apparatus calculating a median of N pixel values arranged in a two-dimensional area of K*K (K is an odd number not smaller than 3) of a digitized image, comprising:
   receiving means for receiving said N pixel values;
   removing means for removing, from said received N pixel values, ((N-1)/2+2) to Nth pixel values as sorted in accordance with a prescribed order; and
   sorting means for outputting, among (N-(N-1)/2) pixel values remaining after removal of the pixel values by said removing means, (N-(N-1)/2)th pixel value as sorted in accordance with said prescribed order as said median.

5. The filtering apparatus according to claim 4, wherein said prescribed order is either ascending order or descending order.

6. The filtering apparatus according to claim 4, wherein said receiving means includes
   dividing means for dividing said received N pixel values into K groups each consisting of K pixel values, and
   group sorting means, for each of said K groups obtained by the division by said dividing means, for receiving and sorting the pixel values of the group in accordance with said prescribed order and outputting to said removing means, said removing means including a plurality of cascade-connected pixel removing units for removing (N-1)/2 pixel values from said N pixel values;
   each of said pixel removing units includes
   a determining unit determining, among first pixel values in accordance with said prescribed order of respective ones of said K groups applied, at least one first and following pixel values in accordance with the prescribed order, and
   a shift storing unit receiving, temporarily storing and outputting said pixel values of said K groups; and
   said shift storing unit removes, in said group including said pixel value determined by said determining unit, said determined pixel value from said pixel values of the stored group, and shifts order of the second and the following pixel values remaining after the removal in accordance with said prescribed order before outputting.

7. A filtering apparatus calculating, where a plurality of local areas including N pixel values of K*K (K is an odd number not smaller than 3) being arranged overlapped with each other in a prescribed area of a digitized image, a median of N pixel values of each of the local areas, said apparatus comprising:
   receiving means for receiving pixel values of said prescribed area and for outputting, for each of said plurality of local areas, N pixel values included in the local area; and
   median extracting means corresponding to each of said plurality of local areas,
   wherein said median extracting means includes
   removing means, receiving from said receiving means N pixel values included in corresponding said local area, for removing, from the input pixel values, first to ((N-1)/2)th pixel values as sorted in accordance with a prescribed order, and
   sorting means for outputting, among (N-(N-1)/2) pixel values remaining after removal of the pixel values by said removing means, first pixel value as sorted in accordance with said prescribed order, as said median.

8. The filtering apparatus according to claim 7, wherein said prescribed order is either ascending order or descending order.

9. The filtering apparatus according to claim 7, wherein said receiving means includes
   dividing means for dividing said received pixel values of said local areas into a plurality of groups each consisting of K pixel values, and
   group sorting means, for each of said plurality of groups obtained by the division by said dividing means, for receiving and sorting the pixel values of the group in accordance with said prescribed order and outputting to said removing means corresponding to said local area to which the group belongs, said removing means having a plurality of cascade-connected pixel removing units for removing (N-1)/2 pixel values from said N pixel values;

each of said pixel removing units includes a determining unit determining, among first pixel values in accordance with said prescribed order of respective ones of said K groups applied, at least one first and following pixel values in accordance with said prescribed order, and a shift storing unit receiving, temporarily storing and outputting said pixel values of said K groups; and said shift storing unit removes, in said group including said pixel value determined by said determining unit, said determined pixel value from said pixel values of the stored group, and shifts order of the second and the following pixel values remaining after the removal in accordance with said prescribed order before outputting.

10. A filtering apparatus calculating, where a plurality of local areas including N pixel values of K*K (K is an odd number not smaller than 3) is arranged overlapped with each other in a prescribed area of a digitized image, a median of N pixel values of each of the local areas, said apparatus comprising:

receiving means for receiving pixel values of said prescribed area and for outputting, for each of said plurality of local areas, N pixel values included in the local area; and median extracting means corresponding to each of said plurality of local areas, said median extracting means including removing means, receiving from said receiving means N pixel values included in corresponding said local area, for removing, from the received pixel values, ((N-1)/2)+2)th to Nth pixel values as sorted in accordance with a prescribed order, and sorting means outputting, among (N-(N-1)/2) pixel values remaining after removal of the pixel values by said removing means, (N-(N-1)/2)th pixel value as sorted in accordance with said prescribed order, as said median.

11. The filtering apparatus according to claim 10, wherein said prescribed order is either ascending order or descending order.

12. The filtering apparatus according to claim 10, wherein said receiving means includes dividing means for dividing said received pixel values of said local areas into a plurality of groups each consisting of K pixel values, and group sorting means, for each of said plurality of groups obtained by the division by said dividing means, for receiving and sorting the pixel values of the group in accordance with said prescribed order and outputting to said removing means corresponding to said local area to which the group belongs;

said removing means has a plurality of cascade-connected pixel removing units for removing (N-1)/2 pixel values from said N pixel values;

each of said pixel removing units includes a determining unit determining, among first pixel values in accordance with said prescribed order of respective ones of said K groups applied, at least one first and following pixel values in accordance with said prescribed order, and a shift storing unit receiving, temporarily storing and outputting said pixel values of said K groups; and said shift storing unit removes, in said group including said pixel value determined by said determining unit, said determined pixel value from said pixel values of the stored group, and shifts order of the second and the following pixel values remaining after the removal in accordance with said prescribed order before outputting.

13. A data driven type information processing apparatus including operating means receiving a packet having at least a destination field storing destination information, an instruction field storing instruction information and data field storing data, for executing an operation in accordance with a data flow program using the received packet, wherein said operating means includes filtering operation means for performing an operation in accordance with a median filtering instruction instructing calculation of a median of N pixel values arranged in a two-dimensional area of K*K (K is an odd number not smaller than 3) of a digitized image, means for other operations, and branching means for outputting, based on said instruction information of said received packet, said received packet either to said filtering operation means or said means for other operations;

said filtering operation means includes removing means for removing, from said N pixel values in said data field of said received packet, first to ((N-1)/2)th pixel values as sorted in accordance with a prescribed order, and sorting means for storing, among (N-(N-1)/2) pixel values remaining after removal of the pixel values by said removing means, first pixel value as sorted in accordance with said prescribed order, as said median in said data field of said packet and outputting said packet.

14. The data driven type information processing apparatus according to claim 13, wherein said prescribed order is either ascending order or descending order.

15. The data driven type information processing apparatus according to claim 13, further comprising:

program storing means for storing said data flow program including a plurality of pieces of said destination information and a plurality of pieces of said instruction information, receiving said packet, reading subsequent said destination information and subsequent said instruction information from said data flow program, storing the read information to said destination field and said instruction field of the received packet, respectively, and outputting the received packet;

pair data detecting means for receiving said packet output from said program storing means, storing contents necessary to execute said instruction information of said instruction field of the received packet and outputting the received packet to said operating means; and input/output control means for receiving said packet output from said operating means, and outputting to the outside or to said program storing means.

16. A data driven type information processing apparatus including operating means receiving a packet having at least a destination field storing destination information, an instruction field storing instruction information and data field storing data, for executing an operation in accordance with a data flow program using the received packet, wherein said operating means includes filtering operation means for performing an operation in accordance with a median filtering instruction instructing calculation of a median of N pixel values arranged in a two-dimensional area of K*K (K is an odd number not smaller than 3) of a digitized image, means for other operations, and branching means for outputting, based on said instruction information of said input packet, said received packet either to said filtering operation means or said means for other operations;

said filtering operation means includes removing means for removing, from said N pixel values in said data field of said received packet, ((N-1)/2)+2) to Nth pixel values as sorted in accordance with a prescribed order, and sorting means for storing, among (N-(N-1)/2) pixel values remaining after removal of the pixel values by said removing means, (N-(N-1)/2)th pixel value as sorted in accordance with said prescribed order, as said median in said data field of said packet and outputting said packet.

17. The data driven type information processing apparatus according to claim 16, further comprising:

program storing means for storing said data flow program including a plurality of pieces of said destination information and a plurality of pieces of said instruction information, receiving said packet, reading subsequent said destination information and subsequent said instruction information from said data flow program, storing the read information to said destination field and said instruction field of the received packet, respectively, and outputting the received packet;

pair data detecting means for receiving said packet output from said program storing means, storing contents necessary to execute said instruction information of said instruction field of the received packet and outputting the received packet to said operating means; and input/output control means for receiving said packet output from said operating means, and outputting to the outside or to said program storing means.

18. A data driven type information processing apparatus including operating means receiving as a packet having at least a destination field storing destination information, an instruction field storing instruction information and data field storing data, for executing an operation in accordance with a data flow program using the received packet, wherein said operating means includes filtering operation means for performing an operation in accordance with a median filtering instruction instructing, where a plurality of areas including N pixel values of K*K (K is an odd number not smaller than 3) are arranged overlapped with each other in a digitized image, calculation of a median of N pixel values of each of the areas, means for other operations, and branching means for outputting, based on said instruction information of said received packet, said received packet either to said filtering operation means or said means for other operations;

said filtering operation means includes receiving means for inputting pixel values of said plurality of local areas of said data field of said received packet, and outputting, for each of said plurality of local areas, a packet having N pixel values included in the local area stored in the data field, and median extracting means corresponding to each of said plurality of local areas; and said median extracting means includes removing means, receiving from said receiving means a packet storing N pixel values included in corresponding said area, for removing, from the input pixel values, first to ((N-1)/2)th pixel values as sorted in accordance with a prescribed order, and sorting means for extracting, among (N-(N-1)/2) pixel values remaining after removal of the pixel values by said removing means in the data field of said packet, first pixel value as sorted in accordance with said prescribed order, as said median, storing the median in said data field of said packet and outputting the packet.

19. The data driven type information processing apparatus according to claim 18, further comprising:

program storing means for storing said data flow program including a plurality of pieces of said destination information and a plurality of pieces of said instruction information, receiving said packet, reading subsequent said destination information and subsequent said instruction information from said data flow program, storing the read information to said destination field and said instruction field of the received packet, respectively, and outputting the received packet;

pair data detecting means for receiving said packet output from said program storing means, storing contents necessary to execute said instruction information of said instruction field of the received packet and outputting the received packet to said operating means; and input/output control means for receiving as an input said packet output from said operating means, and outputting to the outside or to said program storing means.

20. A data driven type information processing apparatus including operating means receiving a packet having at least a destination field storing destination information, an instruction field storing instruction information and data field storing data, for executing an operation in accordance with a data flow program using the received packet, wherein said operating means includes filtering operation means for performing an operation in accordance with a median filtering instruction instructing, where a plurality of local areas including N pixel values of K*K (K is an odd number not smaller than 3) are arranged overlapped with each other in a prescribed area of a digitized image, calculation of a median of N pixel values of each of the local areas, means for other operations, and branching means for outputting, based on said instruction information of said received packet, said received packet either to said filtering operation means or said means for other operations;

said filtering operation means includes receiving means for inputting pixel values of said prescribed area of said data field of received said packet, and outputting, for each of said plurality of local areas, a packet having N pixel values included in the local area stored in the data field, and median extracting means corresponding to each of said plurality of local areas; and said median extracting means includes removing means, receiving from said receiving means a packet storing N pixel values included in corresponding said local area, for removing, from the input pixel values, ((N-1)/2)+2)th to Nth pixel values as sorted in accordance with a prescribed order, and sorting means for extracting, among (N-(N-1)/2) pixel values remaining after removal of the pixel values by said removing means in the data field of said packet, (N-(N-1)/2)th pixel value as sorted in accordance with said prescribed order, as said median, storing the median in said data field of said packet and outputting the packet.

21. The data driven type information processing apparatus according to claim 20, wherein said prescribed order is either ascending order or descending order.

22. The data driven type information processing apparatus according to claim 20, further comprising:

program storing means for storing said data flow program including a plurality of pieces of said destination information and a plurality of pieces of said instruction information, receiving said packet, reading subsequent said destination information and subsequent said instruction information from said data flow program, storing the read information to said destination field and said instruction field of the received packet, respectively, and outputting the received packet;

pair data detecting means for receiving said packet output from said program storing means, storing contents necessary to execute said instruction information of said instruction field of the received packet and outputting the received packet to said operating means; and input/output control means for receiving said packet output from said operating means, and outputting to the outside or to said program storing means.

23. A filtering method for calculating a median of N pixel values arranged in a two-dimensional area of K*K (K is an odd number not smaller than 3) of a digitized image, comprising:

the receiving step of receiving said N pixel values;

the removing step of removing, from said N pixel values received in said receiving step, first to ((N-1)/2)th pixel values as sorted in accordance with a prescribed order; and the sorting step of outputting, among the (N-(N-1)/2) pixel values remaining after the removal of the pixel values in said removing step, first pixel value as sorted in accordance with said prescribed order as said median.

24. A filtering method for calculating a median of N pixel values arranged in a two-dimensional area of K*K (K is an odd number not smaller than 3) of a digitized image, comprising:

the receiving step of receiving said N pixel values;

the removing step of removing, from said N pixel values received in said receiving step, ((N-1)/2)+2) to Nth pixel values as sorted in accordance with a prescribed order; and the sorting step of outputting, among the (N-(N-1)/2) pixel values remaining after removal of the pixel values in said removing step, (N-(N-1)/2)th pixel value as sorted in accordance with said prescribed order as said median.

25. An apparatus comprising:

a memory storing a set of instructions, and a processor executing the stored set of instructions to perform a method for calculating a median of N pixel values arranged in a two-dimensional area of K*K (K is an odd number not smaller than 3) of a digitized image, including:

receiving said N pixel values;

removing, from said N pixel values received in said receiving step, first to ((N-1)/2)th pixel values as sorted in accordance with a prescribed order; and outputting, among the (N-(N-1)/2) pixel values remaining after removal of the pixel values in said removing step, first pixel value as sorted in accordance with said prescribed order as said median.

26. An apparatus comprising:

a memory storing a set of instructions; and a processor executing the stored set of instructions, to perform a method for calculating a median of N pixel values arranged in a two-dimensional area of K*K (K is an odd number not smaller than 3) of a digitized image, including:

receiving said N pixel values;

removing, from said N pixel values received in said receiving step, ((N-1)/2)+2) to Nth pixel values as sorted in accordance with a prescribed order; and outputting, among the (N-(N-1)/2) pixel values remaining after removal of the pixel values in said removing step, (N-(N-1)/2)th pixel value as sorted in accordance with said prescribed order as said median.

27. A computer readable recording medium recording a program to have a computer execute a filtering method, wherein said filtering method is for calculating a median of N pixel values arranged in a two-dimensional area of K*K (K is an odd number not smaller than 3) of a digitized image, including:

the receiving step of receiving said N pixel values;

the removing step of removing, from said N pixel values received in said receiving step, first to ((N-1)/2)th pixel values as sorted in accordance with a prescribed order; and the sorting step of outputting, among the (N-(N-1)/2) pixel values remaining after removal of the pixel values in said removing step, first pixel value as sorted in accordance with said prescribed order, as said median.

28. A computer readable recording medium recording a program to have a computer execute a filtering method, wherein said filtering method is for calculating a median of N pixel values arranged in a two-dimensional area of K*K (K is an odd number not smaller than 3) of a digitized image, including:

the receiving step of receiving said N pixel values;

the removing step of removing, from said N pixel values received in said receiving step, ((N-1)/2)+2) to Nth pixel values as sorted in accordance with a prescribed order; and the sorting step of outputting, among the (N-(N-1)/2) pixel values remaining after removal of the pixel values in said removing step, (N-(N-1)/2)th pixel value as sorted in accordance with said prescribed order, as said median.

29. A filtering method of calculating, where a plurality of areas including N pixel values of K*K (K is an odd number not smaller than 3) are arranged overlapped with each other in a digitized image, a median of N pixel values of each of the areas, comprising:

the receiving step of receiving the pixel values of said plurality of areas, and outputting, for each of said plurality of areas, N pixel values included in the area; and the median extracting step of extracting the median corresponding to each of said plurality of areas, wherein said median extracting step includes the removing step of removing, from said N pixel values included in corresponding said area and received in said receiving step, first to ((N-1)/2)th pixel values as sorted in accordance with a prescribed order; and the sorting step of outputting, among the (N-(N-1)/2) pixel values remaining after the removal of the pixel values in said removing step, first pixel value as sorted in accordance with said prescribed order, as said median.

30. A filtering method of calculating, where a plurality of local areas including N pixel values of K*K (K is an odd number not smaller than 3) are arranged overlapped with each other in a prescribed area of a digitized image, a median of N pixel values of each of the local areas, comprising:

the receiving step of receiving the pixel values of said prescribed area, and outputting, for each of said plurality of local areas, N pixel values included in the local area; and the median extracting step of extracting the median corresponding to each of said plurality of local areas, wherein said median extracting step includes the removing step of removing, from said N pixel values included in corresponding said local area and received in said receiving step, ((N-1)/2)+2)th to Nth pixel values as sorted in accordance with a prescribed order; and the sorting step of outputting, among the (N-(N-1)/2) pixel values remaining after the removal of the pixel values in said removing step, (N-(N-1)/2)th pixel value as sorted in accordance with said prescribed order, as said median.

31. An apparatus comprising:

a memory storing a set of instructions; and a processor, for executing the stored set of instructions, to perform a method for calculating, where a plurality of areas including N pixel values of K*K (K is an odd number not smaller than 3) are arranged overlapped with each other in a digitized image, a median of N pixel values of each of the local areas, including:

receiving the pixel values of said plurality of areas, and outputting, for each of said plurality of areas, N pixel values included in the area; and extracting the median corresponding to each of said plurality of areas; wherein said extracting step includes removing, from said N pixel values included in corresponding said area and received in said receiving step, first to ((N-1)/2)th pixel values as sorted in accordance with a prescribed order; and outputting, among the (N-(N-1)/2) pixel values remaining after the removal of the pixel values in said removing step, first pixel value as sorted in accordance with said prescribed order, as said median.

32. An apparatus comprising;

a memory storing a set of instructions; and a processor, executing the stored set of instructions to perform a method for calculating, where a plurality of local areas including N pixel values of K*K (K is an odd number not smaller than 3) are arranged overlapped with each other in a prescribed area of a digitized image, a median of N pixel values of each of the local areas, including:

receiving as inputs the pixel values of said prescribed area, and outputting, for each of said plurality of local areas, N pixel values included in the local area; and extracting the median corresponding to each of said plurality of local areas; wherein said extracting step includes removing, from said N pixel values included in corresponding said local area and received in said receiving step, ((N-1)/2)+2)th to Nth pixel values as sorted in accordance with a prescribed order; and outputting, among the (N-(N-1)/2) pixel values remaining after the removal of the pixel values in said removing step, (N-(N-1)/2)th pixel value as sorted in accordance with said prescribed order, as said median.

33. A computer readable recording medium recording a program to have a computer execute a filtering method, wherein said filtering method is for calculating, where a plurality of areas including N pixel values of K*K (K is an odd number not smaller than 3) are arranged overlapped with each other in a digitized image, a median of N pixel values of each of the areas, including:

the receiving step of receiving the pixel values of said plurality of areas, and outputting, for each of said plurality of areas, N pixel values included in the area; and the median extracting step of extracting the median corresponding to each of said plurality of areas; wherein said median extracting step includes the removing step of removing, from said N pixel values included in corresponding said area and received in said receiving step, first to ((N-1)/2)th pixel values as sorted in accordance with a prescribed order; and the sorting step of outputting, among the (N-(N-1)/2) pixel values remaining after the removal of the pixel values in said removing step, first pixel value as sorted in accordance with said prescribed order, as said median.

34. A computer readable recording medium recording a program to have a computer execute a filtering method, wherein said filtering method is for calculating, where a plurality of local areas including N pixel values of K*K (K is an odd number not smaller than 3) are arranged overlapped with each other in a prescribed area of a digitized image, a median of N pixel values of each of the local areas, including:

the receiving step of receiving the pixel values of said prescribed area, and outputting, for each of said plurality of local areas, N pixel values included in the local area; and the median extracting step of extracting the median corresponding to each of said plurality of local areas; wherein said median extracting step includes the removing step of removing, from said N pixel values included in corresponding said local area and received in said receiving step, ((N-1)/2)+2)th to Nth pixel values as sorted in accordance with a prescribed order; and the sorting step of outputting, among the (N-(N-1)/2) pixel values remaining after the removal of the pixel values in said removing step, (N-(N-1)/2)th pixel value as sorted in accordance with said prescribed order, as said median.

* * * * *